(12) United States Patent
Oki et al.

(10) Patent No.: US 6,492,920 B2
(45) Date of Patent: Dec. 10, 2002

(54) MODULATION METHOD, MODULATOR, TRANSMISSION APPARATUS AND RECORDING MEDIUM

(75) Inventors: Tsuyoshi Oki, Kanagawa-ken (JP); Atsushi Hayami, Kanagawa-ken (JP)

(73) Assignee: Victor Company of Japan, Limited, Kanagawa-ken (JP)

( * ) Notice: Subject to any disclaimer, the term of this patent is extended or adjusted under 35 U.S.C. 154(b) by 0 days.

(21) Appl. No.: 09/983,948

(22) Filed: Oct. 26, 2001

(65) Prior Publication Data

US 2002/0050935 A1 May 2, 2002

(30) Foreign Application Priority Data

Oct. 31, 2000  (JP) ........................ 2000-331736
Sep. 11, 2001  (JP) ........................ 2001-274645

(51) Int. Cl.[7] ............................. H03M 7/00
(52) U.S. Cl. ................... 341/106; 341/58; 341/59; 369/59.24
(58) Field of Search ................... 341/106, 59, 58, 341/68, 69, 65; 360/29; 369/59.24; 375/271

(56) References Cited

U.S. PATENT DOCUMENTS

| 4,520,346 A | | 5/1985 | Shamada ............ 340/347 |
| 5,506,581 A | * | 4/1996 | Ino et al. ............ 341/58 |
| 5,790,056 A | | 8/1998 | Shouhamer Immink ..... 341/58 |
| 5,818,367 A | * | 10/1998 | Okazaki et al. ............ 341/106 |
| 5,870,037 A | * | 2/1999 | Okazaki et al. ............ 341/58 |
| 5,952,944 A | * | 9/1999 | Nonaka et al. ............ 341/59 |
| 6,297,753 B1 | * | 10/2001 | Hayami ............ 341/59 |

FOREIGN PATENT DOCUMENTS

| EP | 0493 044 A2 | 7/1992 |
| EP | 0 718 843 A1 | 6/1996 |
| JP | 2000-286709 | 10/2000 |

OTHER PUBLICATIONS

Technical Report of IEICE MR99–75 (2000–01), "New Signal Processing System of High Density Optical Disk". Jan. 2000, pp. 27–32.

* cited by examiner

Primary Examiner—Brian Young
Assistant Examiner—John Nguyen
(74) Attorney, Agent, or Firm—Gary M. Nath; Harold L. Novick; Marvin C. Berkowitz

(57) ABSTRACT

A coding table portion includes six coding tables each storing a code word and status information indicating a coding table for use in modulating a next input data word in order to obtain a next code word which satisfies a predetermined run length restriction rule even if the next code word is coupled directly with the preceding code word, corresponding to each input data word. In the coding table portion, the code words and status informations allocated corresponding to input data words of a number set up preliminarily in succession from the highest appearance frequency to a lower one in one or more coding tables of the plural coding tables are replaced with code words having smaller RDSs and status informations allocated corresponding to other input data words in the same coding table. Consequently, the input data word is modulated using the six coding tables.

27 Claims, 29 Drawing Sheets

FIG.1
PRIOR ART

| INPUT WORD | TABLE OF STATUS "0" | "1" | "2" | "3" |
|---|---|---|---|---|
| 0 | 000000000100000 : 4 | 001000010000000 : 6 | 000000000100000 : 4 | 001001000000000 : 4 |
| 1 | 000000000100000 : 5 | 001000010000000 : 3 | 000000000100000 : 5 | 001001000000000 : 5 |
| 2 | 000000000100001 : 0 | 000010000000001 : 0 | 000000000100001 : 0 | 001001001001001 : 0 |
| 3 | 000000000100001 : 1 | 000010000000001 : 1 | 000000000100001 : 1 | 001001001001001 : 1 |
| 4 | 000000000100100 : 1 | 000010000000010 : 1 | 000000000100100 : 1 | 001001000100000 : 1 |
| 5 | 000000000100100 : 3 | 000010000000010 : 2 | 000000000100100 : 3 | 001001000100000 : 3 |
| 6 | 000000000100100 : 4 | 000010000000010 : 3 | 000000000100100 : 4 | 001001000100000 : 4 |
| 7 | 000000000100100 : 5 | 000010000000100 : 1 | 000000000100100 : 5 | 001001000100000 : 5 |
| 8 | 000000001000000 : 1 | 000010000000100 : 3 | 000000001000000 : 1 | 001001001000100 : 1 |
| 9 | 000000001000000 : 3 | 000010000000100 : 4 | 000000001000000 : 3 | 001001001000100 : 3 |
| 10 | 000000001000000 : 4 | 000010000000100 : 5 | 000000001000000 : 4 | 001001001000100 : 4 |
| 11 | 000000001000000 : 5 | 000010000001000 : 1 | 000000001000000 : 5 | 001001001000100 : 5 |
| 12 | 000001001000000 : 1 | 000010000001000 : 3 | 000001001000000 : 1 | 001001001000000 : 1 |
| 13 | 000001001000000 : 3 | 000010000001000 : 4 | 000001001000000 : 3 | 001001001000000 : 3 |
| 14 | 000001001000000 : 4 | 000010000001000 : 5 | 000001001000000 : 4 | 001001001000000 : 4 |
| 15 | 000001001000000 : 5 | 000010000001001 : 0 | 000001001000000 : 5 | 001001001000000 : 5 |
| 16 | 000000001001001 : 0 | 000010000001001 : 1 | 000000001001001 : 0 | 001001000010001 : 0 |
| 17 | 000000001001001 : 1 | 001000000100100 : 1 | 000000001001001 : 1 | 001001000010001 : 1 |
| 18 | 000000100010010 : 1 | 001000000100100 : 3 | 000000100010010 : 1 | 001001000010010 : 1 |
| 19 | 000000100010010 : 2 | 001000000100100 : 4 | 000000100010010 : 2 | 001001000010010 : 2 |
| 20 | 000000100010010 : 3 | 001000000100100 : 5 | 000000100010010 : 3 | 001001000010010 : 3 |
| 21 | 000000010001001 : 0 | 000010000010001 : 0 | 000000010001001 : 0 | 001001000100001 : 0 |
| 22 | 000000010001001 : 1 | 000010000010001 : 1 | 000000010001001 : 1 | 001001000100001 : 1 |
| 23 | 000000010010010 : 1 | 000010000010010 : 1 | 000000010010010 : 1 | 001001000100010 : 1 |
| 24 | 000000010010010 : 2 | 000010000010010 : 2 | 000000010010010 : 2 | 001001000100010 : 2 |
| 25 | 000000010010010 : 3 | 000010000010010 : 3 | 000000010010010 : 3 | 001001000100010 : 3 |
| 26 | 000000100100100 : 1 | 000010000100000 : 1 | 000000100100100 : 1 | 001001000100100 : 1 |
| 27 | 000000100100100 : 3 | 000010000100000 : 3 | 000000100100100 : 3 | 001001000100100 : 3 |
| 28 | 000000100100100 : 4 | 000010000100000 : 4 | 000000100100100 : 4 | 001001000100100 : 4 |
| 29 | 000000100100100 : 5 | 000010000100000 : 5 | 000000100100100 : 5 | 001001000100100 : 5 |
| 30 | 000000010010001 : 0 | 000010000100001 : 0 | 000000010010001 : 0 | 001001001000001 : 0 |
| 31 | 000000010010001 : 1 | 000010000100001 : 1 | 000000010010001 : 1 | 001001001000001 : 1 |
| 32 | 000000100100010 : 1 | 000010000100010 : 1 | 000000100100010 : 1 | 001001001000010 : 1 |
| 33 | 000000100100010 : 2 | 000010000100010 : 2 | 000000100100010 : 2 | 001001001000010 : 2 |
| 34 | 000000100100010 : 3 | 000010000100010 : 3 | 000000100100010 : 3 | 001001001000010 : 3 |
| 35 | 000001000100100 : 1 | 000010000100100 : 1 | 000001000100100 : 1 | 001001001001000 : 1 |
| 36 | 000001000100100 : 3 | 000010000100100 : 3 | 000001000100100 : 3 | 001001001001000 : 3 |
| 37 | 000001000100100 : 4 | 000010000100100 : 4 | 000001000100100 : 4 | 001001001001000 : 4 |
| 38 | 000001000100100 : 5 | 000010000100100 : 5 | 000001000100100 : 5 | 001001001001000 : 5 |

| "4" | "5" | "6" |
|---|---|---|
| 0100010000000000 : 4 | 1000010000000000 : 4 | 0010000100000000 : 6 |
| 0100010000000000 : 5 | 1000010000000000 : 5 | 0010000100000000 : 3 |
| 0100100100001001 : 0 | 1000010000001000 : 1 | 0100100100001001 : 0 |
| 0100100100001001 : 1 | 1000010000001000 : 3 | 0100100100001001 : 1 |
| 0100100100010000 : 1 | 1000010000001000 : 4 | 0100100100010000 : 1 |
| 0100100100010000 : 3 | 1000010000001000 : 5 | 0100100100010000 : 3 |
| 0100100100010000 : 4 | 1000010000001001 : 0 | 0100100100010000 : 4 |
| 0100100100010000 : 5 | 1000010000001001 : 1 | 0100100100010000 : 5 |
| 0100100001000100 : 1 | 1000010000010000 : 1 | 0100100001000100 : 1 |
| 0100100001000100 : 3 | 1000010000010000 : 3 | 0100100001000100 : 3 |
| 0100100001000100 : 4 | 1000010000010000 : 4 | 0100100001000100 : 4 |
| 0100100001000100 : 5 | 1000010000010000 : 5 | 0100100001000100 : 5 |
| 1000000000001000 : 1 | 1000010000010001 : 0 | 1000000000001000 : 1 |
| 1000000000001000 : 3 | 1000010000010001 : 1 | 1000000000001000 : 3 |
| 1000000000001000 : 4 | 1000010000010010 : 1 | 1000000000001000 : 4 |
| 1000000000001000 : 5 | 1000010000010010 : 2 | 1000000000001000 : 5 |
| 1000000000010001 : 0 | 1000010000010010 : 3 | 1000000000010001 : 0 |
| 1000000000010001 : 1 | 1000010000100000 : 1 | 1000000000010001 : 1 |
| 1000000000010010 : 1 | 1000010000100000 : 3 | 1000000000010010 : 1 |
| 1000000000010010 : 2 | 1000010000100000 : 4 | 1000000000010010 : 2 |
| 1000000000010010 : 3 | 1000010000100000 : 5 | 1000000000010010 : 3 |
| 1000000000001001 : 0 | 1000010000100001 : 0 | 1000000000001001 : 0 |
| 1000000000001001 : 1 | 1000010000100001 : 1 | 1000000000001001 : 1 |
| 1000000000100010 : 1 | 1000010000100010 : 1 | 1000000000100010 : 1 |
| 1000000000100010 : 2 | 1000010000100010 : 2 | 1000000000100010 : 2 |
| 1000000000100010 : 3 | 1000010000100010 : 3 | 1000000000100010 : 3 |
| 0100100100000100 : 1 | 1000010000100100 : 1 | 0100100100000100 : 1 |
| 0100100100000100 : 3 | 1000010000100100 : 3 | 0100100100000100 : 3 |
| 0100100100000100 : 4 | 1000010000100100 : 4 | 0100100100000100 : 4 |
| 0100100100000100 : 5 | 1000010000100100 : 5 | 0100100100000100 : 5 |
| 0100100100010001 : 0 | 1000010001000000 : 1 | 0100100100010001 : 0 |
| 0100100100010001 : 1 | 1000010001000000 : 3 | 0100100100010001 : 1 |
| 0100100100010010 : 1 | 1000010001000000 : 4 | 0100100100010010 : 1 |
| 0100100100010010 : 2 | 1000010001000000 : 5 | 0100100100010010 : 2 |
| 0100100100010010 : 3 | 1000010001000001 : 0 | 0100100100010010 : 3 |
| 0100100100001000 : 1 | 1000010001000001 : 1 | 0100100100001000 : 1 |
| 0100100100001000 : 3 | 1000010001000010 : 1 | 0100100100001000 : 3 |
| 0100100100001000 : 4 | 1000010001000010 : 2 | 0100100100001000 : 4 |
| 0100100100001000 : 5 | 1000010001000010 : 3 | 0100100100001000 : 5 |

FIG.4

| INPUT WORD | TABLE OF STATUS "0" | | "1" | | "2" | |
|---|---|---|---|---|---|---|
| 0 | 000000000100000 | 4 | 001000010000000 | 4 | 000000000100000 | 4 |
| 1 | 000000000100000 | 5 | 001000010000000 | 3 | 000000000100000 | 5 |
| 2 | 000000000100001 | 0 | 000010000000001 | 0 | 000000000100001 | 0 |
| 3 | 000000000100001 | 1 | 000010000000001 | 1 | 000000000100001 | 1 |
| 4 | 000000000100100 | 1 | 000010000000010 | 1 | 000000000100100 | 1 |
| 5 | 000000000100100 | 3 | 000010000000010 | 2 | 000000000100100 | 3 |
| 6 | 000000000100100 | 4 | 000010000000010 | 3 | 000000000100100 | 4 |
| 7 | 000000000100100 | 5 | 000010000000100 | 1 | 000000000100100 | 5 |
| 8 | 000000001000000 | 1 | 000010000000100 | 3 | 000000001000000 | 1 |
| 9 | 000000001000000 | 3 | 000010000000100 | 4 | 000000001000000 | 3 |
| 10 | 000000001000000 | 4 | 000010000000100 | 5 | 000000001000000 | 4 |
| 11 | 000000001000000 | 5 | 000010000001000 | 1 | 000000001000000 | 5 |
| 12 | 000001001000000 | 1 | 000010000001000 | 3 | 000001001000000 | 1 |
| 13 | 000001001000000 | 3 | 000010000001000 | 4 | 000001001000000 | 3 |
| 14 | 000001001000000 | 4 | 000010000001000 | 5 | 000001001000000 | 4 |
| 15 | 000001001000000 | 5 | 000010000001001 | 0 | 000001001000000 | 5 |
| 16 | 000000001001001 | 0 | 000010000001001 | 1 | 000000001001001 | 0 |
| 17 | 000000001001001 | 1 | 001000000100100 | 1 | 000000001001001 | 1 |
| 18 | 000000100010010 | 1 | 001000000100100 | 3 | 000000100010010 | 1 |
| 19 | 000000100010010 | 2 | 001000000100100 | 4 | 000000100010010 | 2 |
| 20 | 000000100010010 | 3 | 001000000100100 | 5 | 000000100010010 | 3 |
| 21 | 000000010001001 | 0 | 000010000010001 | 0 | 000000010001001 | 0 |
| 22 | 000000010001001 | 1 | 000010000010001 | 1 | 000000010001001 | 1 |
| 23 | 000000010010010 | 1 | 000010000010010 | 1 | 000000010010010 | 1 |
| 24 | 000000010010010 | 2 | 000010000010010 | 2 | 000000010010010 | 2 |
| 25 | 000000010010010 | 3 | 000010000010010 | 3 | 000000010010010 | 3 |
| 26 | 000000100100100 | 1 | 000010000100000 | 1 | 000000100100100 | 1 |
| 27 | 000000100100100 | 3 | 000010000100000 | 3 | 000000100100100 | 3 |
| 28 | 000000100100100 | 4 | 000010000100000 | 4 | 000000100100100 | 4 |
| 29 | 000000100100100 | 5 | 000010000100000 | 5 | 000000100100100 | 5 |
| 30 | 000000010010001 | 0 | 000010000100001 | 0 | 000000010010001 | 0 |
| 31 | 000000010010001 | 1 | 000010000100001 | 1 | 000000010010001 | 1 |
| 32 | 000000100100010 | 1 | 000010000100010 | 1 | 000000100100010 | 1 |
| 33 | 000000100100010 | 2 | 000010000100010 | 2 | 000000100100010 | 2 |
| 34 | 000000100100010 | 3 | 000010000100010 | 3 | 000000100100010 | 3 |
| 35 | 000001000100100 | 1 | 000010000100100 | 1 | 000001000100100 | 1 |
| 36 | 000001000100100 | 3 | 000010000100100 | 3 | 000001000100100 | 3 |
| 37 | 000001000100100 | 4 | 000010000100100 | 4 | 000001000100100 | 4 |
| 38 | 000001000100100 | 5 | 000010000100100 | 5 | 000001000100100 | 5 |

| "3" | | "4" | | "5" | |
|---|---|---|---|---|---|
| 001001000000000 | 4 | 010010001000100 | 4 | 100001000000000 | 4 |
| 001001000000000 | 5 | 010010001000100 | 5 | 100001000000000 | 5 |
| 001001001001001 | 0 | 010010010001001 | 0 | 100001000001000 | 1 |
| 001001001001001 | 1 | 010010010001001 | 1 | 100001000001000 | 3 |
| 001001000100000 | 1 | 010010010010000 | 1 | 100001000001000 | 4 |
| 001001000100000 | 3 | 010010010010000 | 3 | 100001000001000 | 5 |
| 001001000100000 | 4 | 010010010010000 | 4 | 100001000001001 | 0 |
| 001001000100000 | 5 | 010010010010000 | 5 | 100001000001001 | 1 |
| 001001001000100 | 1 | 010010001000100 | 1 | 100001000010000 | 1 |
| 001001001000100 | 3 | 010010001000100 | 3 | 100001000010000 | 3 |
| 001001001000100 | 4 | 010001000000000 | 4 | 100001000010000 | 4 |
| 001001001000100 | 5 | 010001000000000 | 5 | 100001000010000 | 5 |
| 001001001000000 | 1 | 100000000001000 | 1 | 100001000010001 | 0 |
| 001001001000000 | 3 | 100000000001000 | 3 | 100001000010001 | 1 |
| 001001001000000 | 4 | 100000000001000 | 4 | 100001000010010 | 1 |
| 001001001000000 | 5 | 100000000001000 | 5 | 100001000010010 | 2 |
| 001001000010001 | 0 | 100000000010001 | 0 | 100001000010010 | 3 |
| 001001000010001 | 1 | 100000000010001 | 1 | 100001000100000 | 1 |
| 001001000010010 | 1 | 100000000010010 | 1 | 100001000100000 | 3 |
| 001001000010010 | 2 | 100000000010010 | 2 | 100001000100000 | 4 |
| 001001000010010 | 3 | 100000000010010 | 3 | 100001000100000 | 5 |
| 001001000100001 | 0 | 100000000001001 | 0 | 100001000100001 | 0 |
| 001001000100001 | 1 | 100000000001001 | 1 | 100001000100001 | 1 |
| 001001000100010 | 1 | 100000000100010 | 1 | 100001000100010 | 1 |
| 001001000100010 | 2 | 100000000100010 | 2 | 100001000100010 | 2 |
| 001001000100010 | 3 | 100000000100010 | 3 | 100001000100010 | 3 |
| 001001000100100 | 1 | 010010010000100 | 1 | 100001000100100 | 1 |
| 001001000100100 | 3 | 010010010000100 | 3 | 100001000100100 | 3 |
| 001001000100100 | 4 | 010010010000100 | 4 | 100001000100100 | 4 |
| 001001000100100 | 5 | 010010010000100 | 5 | 100001000100100 | 5 |
| 001001001000001 | 0 | 010010010010001 | 0 | 100001001000000 | 1 |
| 001001001000001 | 1 | 010010010010001 | 1 | 100001001000000 | 3 |
| 001001001000010 | 1 | 010010010010010 | 1 | 100001001000000 | 4 |
| 001001001000010 | 2 | 010010010010010 | 2 | 100001001000000 | 5 |
| 001001001000010 | 3 | 010010010010010 | 3 | 100001001000001 | 0 |
| 001001001001000 | 1 | 010010010001000 | 1 | 100001001000001 | 1 |
| 001001001001000 | 3 | 010010010001000 | 3 | 100001001000010 | 1 |
| 001001001001000 | 4 | 010010010001000 | 4 | 100001001000010 | 2 |
| 001001001001000 | 5 | 010010010001000 | 5 | 100001001000010 | 3 |

FIG.5

| INPUT WORD | TABLE OF STATUS "0" | | "1" | | "2" | |
|---|---|---|---|---|---|---|
| 39 | 000000001000001 | 0 | 000010001000000 | 1 | 000000001000001 | 0 |
| 40 | 000000001000001 | 1 | 000010001000000 | 3 | 000000001000001 | 1 |
| 41 | 000000001000010 | 1 | 000010001000000 | 4 | 000000001000010 | 1 |
| 42 | 000000001000010 | 2 | 000010001000000 | 5 | 000000001000010 | 2 |
| 43 | 000000001000010 | 3 | 000010001000001 | 0 | 000000001000010 | 3 |
| 44 | 000001001000100 | 1 | 000010001000001 | 1 | 000001001000100 | 1 |
| 45 | 000001001000100 | 3 | 000010001000010 | 1 | 000001001000100 | 3 |
| 46 | 000001001000100 | 4 | 000010001000010 | 2 | 000001001000100 | 4 |
| 47 | 000001001000100 | 5 | 000010001000010 | 3 | 000001001000100 | 5 |
| 48 | 000001001000010 | 1 | 000010001000100 | 1 | 000001001000010 | 1 |
| 49 | 000001001000010 | 2 | 000010001000100 | 3 | 000001001000010 | 2 |
| 50 | 000001001000010 | 3 | 000010001000100 | 4 | 000001001000010 | 3 |
| 51 | 000001001001000 | 1 | 000010001000100 | 5 | 000001001001000 | 1 |
| 52 | 000001001001000 | 3 | 000010001001000 | 1 | 000001001001000 | 3 |
| 53 | 000001001001000 | 4 | 000010001001000 | 3 | 000001001001000 | 4 |
| 54 | 000001001001000 | 5 | 000010001001000 | 4 | 000001001001000 | 5 |
| 55 | 000001001001001 | 0 | 000010001001000 | 5 | 000001001001001 | 0 |
| 56 | 000001001001001 | 1 | 000010001001001 | 0 | 000001001001001 | 1 |
| 57 | 000000000100010 | 1 | 000010001001001 | 1 | 000000000100010 | 1 |
| 58 | 000000000100010 | 2 | 000010010000000 | 3 | 000000000100010 | 2 |
| 59 | 000000000100010 | 3 | 000010010000000 | 5 | 000000000100010 | 3 |
| 60 | 000000010000000 | 3 | 000010010000000 | 4 | 000000010000000 | 3 |
| 61 | 000000010000000 | 5 | 000010010000001 | 0 | 000000010000000 | 5 |
| 62 | 000000010000000 | 4 | 000010010000001 | 1 | 000000010000000 | 4 |
| 63 | 000000010000001 | 0 | 000010010000010 | 1 | 000000010000001 | 0 |
| 64 | 000000010000001 | 1 | 000010010000010 | 2 | 000000010000001 | 1 |
| 65 | 000000010000010 | 1 | 000010010000010 | 3 | 000000010000010 | 1 |
| 66 | 000000010000010 | 2 | 000010010000100 | 1 | 000000010000010 | 2 |
| 67 | 000000010000010 | 3 | 000010010000100 | 3 | 000000010000010 | 3 |
| 68 | 000000010000100 | 1 | 000010010000100 | 4 | 000000010000100 | 1 |
| 69 | 000000010000100 | 3 | 000010010000100 | 5 | 000000010000100 | 3 |
| 70 | 000000010000100 | 4 | 000010010001000 | 1 | 000000010000100 | 4 |
| 71 | 000000010000100 | 5 | 000010010001000 | 3 | 000000010000100 | 5 |
| 72 | 000000010010000 | 1 | 000010010001000 | 4 | 000000010010000 | 1 |
| 73 | 000000010010000 | 3 | 000010010001000 | 5 | 000000010010000 | 3 |
| 74 | 000000010010000 | 4 | 000010010001001 | 0 | 000000010010000 | 4 |
| 75 | 000000010010000 | 5 | 000010010001001 | 1 | 000000010010000 | 5 |
| 76 | 000000100000000 | 3 | 000010010010000 | 1 | 000000100000000 | 3 |
| 77 | 000000100000000 | 5 | 000010010010000 | 3 | 000000100000000 | 5 |
| 78 | 000000100000000 | 4 | 000010010010000 | 4 | 000000100000000 | 4 |

| "3" | "4" | "5" |
|---|---|---|
| 010000000010001  0 | 010010010000001  0 | 100001001000100  1 |
| 010000000010001  1 | 010010010000001  1 | 100001001000100  3 |
| 010000000010010  1 | 010010010000010  1 | 100001001000100  4 |
| 010000000010010  2 | 010010010000010  2 | 100001001000100  5 |
| 010000000010010  3 | 010010010000010  3 | 100001001001000  1 |
| 010000000000100  1 | 010010001001000  1 | 100001001001000  3 |
| 010000000000100  3 | 010010001001000  3 | 100001001001000  4 |
| 010000000000100  4 | 010010001001000  4 | 100001001001000  5 |
| 010000000000100  5 | 010010001001000  5 | 100001001001001  0 |
| 010000010010010  1 | 100000001000001  0 | 100001001001001  1 |
| 010000010010010  2 | 100000001000001  1 | 100010000000000  5 |
| 010000010010010  3 | 100000001000010  1 | 100010000000001  0 |
| 010000000001000  1 | 100000001000010  2 | 100010000000001  1 |
| 010000000001000  3 | 100000001000010  3 | 100010000000010  1 |
| 010000000001000  4 | 100000001000100  1 | 100010000000010  2 |
| 010000000001000  5 | 100000001000100  3 | 100010000000010  3 |
| 010000000001001  0 | 100000001000100  4 | 100010000000100  1 |
| 010000000001001  1 | 100000001000100  5 | 100010000000100  3 |
| 010000010000010  1 | 100000010000001  0 | 100010000000100  4 |
| 010000010000010  2 | 100000010000001  1 | 100010000000100  5 |
| 010000010000010  3 | 100000010000010  1 | 100010000001000  1 |
| 010000010000000  3 | 100000010000010  2 | 100010000001000  3 |
| 010000010000000  5 | 100000010000010  3 | 100010000001000  4 |
| 010000010000000  4 | 100000000010000  1 | 100010000001000  5 |
| 010000001000001  0 | 100000000010000  3 | 100010000001001  0 |
| 010000001000001  1 | 100000000010000  4 | 100010000001001  1 |
| 010000001000010  1 | 100000000010000  5 | 100010000010000  1 |
| 010000001000010  2 | 100000000100000  1 | 100010000010000  3 |
| 010000001000010  3 | 100000000100000  3 | 100010000010000  4 |
| 010000000100100  1 | 100000000100000  4 | 100010000010000  5 |
| 010000000100100  3 | 100000000100000  5 | 100010000010001  0 |
| 010000000100100  4 | 100000010000000  3 | 100010000010001  1 |
| 010000000100100  5 | 100000010000000  5 | 100010000010010  1 |
| 010000001000100  1 | 100000010000000  4 | 100010000010010  2 |
| 010000001000100  3 | 100000000100001  0 | 100010000010010  3 |
| 010000001000100  4 | 100000000100001  1 | 100010000100000  1 |
| 010000001000100  5 | 100000010010010  1 | 100010000100000  3 |
| 010000100000000  3 | 100000010010010  2 | 100010000100000  4 |
| 010000100000000  5 | 100000010010010  3 | 100010000100000  5 |
| 010000100000000  4 | 100000000100100  1 | 100010000100001  0 |

FIG.6

| INPUT WORD | TABLE OF STATUS "0" | | "1" | | "2" | |
|---|---|---|---|---|---|---|
| 79 | 000000100000001 | 0 | 000010010010000 | 5 | 000000100000001 | 0 |
| 80 | 000000100000001 | 1 | 000010010010001 | 0 | 000000100000001 | 1 |
| 81 | 000000100000010 | 1 | 000010010010001 | 1 | 000000100000010 | 1 |
| 82 | 000000100000010 | 2 | 000010010010010 | 1 | 000000100000010 | 2 |
| 83 | 000000100000010 | 3 | 000010010010010 | 2 | 000000100000010 | 3 |
| 84 | 000000100000100 | 1 | 000010010010010 | 3 | 000000100000100 | 1 |
| 85 | 000000100000100 | 3 | 000100000000001 | 0 | 000000100000100 | 3 |
| 86 | 000000100000100 | 4 | 000100000000001 | 1 | 000000100000100 | 4 |
| 87 | 000000100000100 | 5 | 000100000000010 | 1 | 000000100000100 | 5 |
| 88 | 000000100001000 | 1 | 000100000000010 | 2 | 000000100001000 | 1 |
| 89 | 000000100001000 | 3 | 000100000000010 | 3 | 000000100001000 | 3 |
| 90 | 000000100001000 | 4 | 000100000001001 | 0 | 000000100001000 | 4 |
| 91 | 000000100001000 | 5 | 000100000001001 | 1 | 000000100001000 | 5 |
| 92 | 000000100001001 | 0 | 000100000100001 | 0 | 000000100001001 | 0 |
| 93 | 000000100001001 | 1 | 000100000100001 | 1 | 000000100001001 | 1 |
| 94 | 000000100010000 | 1 | 000100100000010 | 1 | 000000100010000 | 1 |
| 95 | 000000100010000 | 3 | 000100100000010 | 2 | 000000100010000 | 3 |
| 96 | 000000100010000 | 4 | 000100100000010 | 3 | 000000100010000 | 4 |
| 97 | 000000100010000 | 5 | 000100100010000 | 1 | 000000100010000 | 5 |
| 98 | 000000100010001 | 0 | 000100100010000 | 3 | 000000100010001 | 0 |
| 99 | 000000100010001 | 1 | 000100100010000 | 4 | 000000100010001 | 1 |
| 100 | 000000100100000 | 1 | 000100100010000 | 5 | 000000100100000 | 1 |
| 101 | 000000100100000 | 3 | 000100100100000 | 1 | 000000100100000 | 3 |
| 102 | 000000100100000 | 4 | 000100100100000 | 3 | 000000100100000 | 4 |
| 103 | 000000100100000 | 5 | 000100100100000 | 4 | 000000100100000 | 5 |
| 104 | 000000100100001 | 0 | 000100100100000 | 5 | 000000100100001 | 0 |
| 105 | 000000100100001 | 1 | 000100000010010 | 1 | 000000100100001 | 1 |
| 106 | 000001000000001 | 0 | 000100000010010 | 2 | 000001000000001 | 0 |
| 107 | 000001000000001 | 1 | 000100000010010 | 3 | 000001000000001 | 1 |
| 108 | 000001000000010 | 1 | 000100000100010 | 1 | 000001000000010 | 1 |
| 109 | 000001000000010 | 2 | 000100000100010 | 2 | 000001000000010 | 2 |
| 110 | 000001000000010 | 3 | 000100000100010 | 3 | 000001000000010 | 3 |
| 111 | 000001000000100 | 1 | 000100000100100 | 1 | 000001000000100 | 1 |
| 112 | 000001000000100 | 3 | 000100000100100 | 3 | 000001000000100 | 3 |
| 113 | 000001000000100 | 4 | 000100000100100 | 4 | 000001000000100 | 4 |
| 114 | 000001000000100 | 5 | 000100000100100 | 5 | 000001000000100 | 5 |
| 115 | 000001000001000 | 1 | 000100001000100 | 1 | 000001000001000 | 1 |
| 116 | 000001000001000 | 3 | 000100001000100 | 3 | 000001000001000 | 3 |
| 117 | 000001000001000 | 4 | 000100001000100 | 4 | 000001000001000 | 4 |
| 118 | 000001000001000 | 5 | 000100001000100 | 5 | 000001000001000 | 5 |

| "3" | | "4" | | "5" | |
|---|---|---|---|---|---|
| 010000010000001 | 0 | 100000000100100 | 3 | 100010000100001 | 1 |
| 010000010000001 | 1 | 100000000100100 | 4 | 100010000100010 | 1 |
| 010000000100010 | 1 | 100000000100100 | 5 | 100010000100010 | 2 |
| 010000000100010 | 2 | 100000001000000 | 1 | 100010000100010 | 3 |
| 010000000100010 | 3 | 100000001000000 | 3 | 100010000100100 | 1 |
| 010000001001000 | 1 | 100000001000000 | 4 | 100010000100100 | 3 |
| 010000001001000 | 3 | 100000001000000 | 5 | 100010000100100 | 4 |
| 010000001001000 | 4 | 100000001001000 | 1 | 100010000100100 | 5 |
| 010000001001000 | 5 | 100000001001000 | 3 | 100010001000000 | 1 |
| 010000010000100 | 1 | 100000001001000 | 4 | 100010001000000 | 3 |
| 010000010000100 | 3 | 100000001001000 | 5 | 100010001000000 | 4 |
| 010000010000100 | 4 | 100000100000000 | 3 | 100010001000000 | 5 |
| 010000010000100 | 5 | 100000100000000 | 5 | 100010001000001 | 0 |
| 010000001001001 | 0 | 100000100000000 | 4 | 100010001000001 | 1 |
| 010000001001001 | 1 | 100000001001001 | 0 | 100010001000010 | 1 |
| 010000010001000 | 1 | 100000001001001 | 1 | 100010001000010 | 2 |
| 010000010001000 | 3 | 100000100000010 | 1 | 100010001000010 | 3 |
| 010000010001000 | 4 | 100000100000010 | 2 | 100010001000100 | 1 |
| 010000010001000 | 5 | 100000100000010 | 3 | 100010001000100 | 3 |
| 010000010010001 | 0 | 100000010010000 | 1 | 100010001000100 | 4 |
| 010000010010001 | 1 | 100000010010000 | 3 | 100010001000100 | 5 |
| 010000010010000 | 1 | 100000010010000 | 4 | 100010001001000 | 1 |
| 010000010010000 | 3 | 100000010010000 | 5 | 100010001001000 | 3 |
| 010000010010000 | 4 | 100000010000100 | 1 | 100010001001000 | 4 |
| 010000010010000 | 5 | 100000010000100 | 3 | 100010001001000 | 5 |
| 010000010001001 | 0 | 100000010000100 | 4 | 100010001001001 | 0 |
| 010000010001001 | 1 | 100000010000100 | 5 | 100010001001001 | 1 |
| 010000100000001 | 0 | 100000010001001 | 0 | 100010010000000 | 3 |
| 010000100000001 | 1 | 100000010001001 | 1 | 100010010000000 | 5 |
| 010000100000010 | 1 | 100000010001000 | 1 | 100010010000000 | 4 |
| 010000100000010 | 2 | 100000010001000 | 3 | 100010010000001 | 0 |
| 010000100000010 | 3 | 100000010001000 | 4 | 100010010000001 | 1 |
| 010000100000100 | 1 | 100000010001000 | 5 | 100010010000010 | 1 |
| 010000100000100 | 3 | 100000010010001 | 0 | 100010010000010 | 2 |
| 010000100000100 | 4 | 100000010010001 | 1 | 100010010000010 | 3 |
| 010000100000100 | 5 | 100000100000100 | 1 | 100010010000100 | 1 |
| 010000100001000 | 1 | 100000100000100 | 3 | 100010010000100 | 3 |
| 010000100001000 | 3 | 100000100000100 | 4 | 100010010000100 | 4 |
| 010000100001000 | 4 | 100000100000100 | 5 | 100010010000100 | 5 |
| 010000100001000 | 5 | 100000100000001 | 0 | 100010010001000 | 1 |

FIG.7

| INPUT WORD | TABLE OF STATUS "0" | | "1" | | "2" | |
|---|---|---|---|---|---|---|
| 119 | 000001000001001 | 0 | 000100001001000 | 1 | 000001000001001 | 0 |
| 120 | 000001000001001 | 1 | 000100001001000 | 3 | 000001000001001 | 1 |
| 121 | 000001000010000 | 1 | 000100001001000 | 4 | 000001000010000 | 1 |
| 122 | 000001000010000 | 3 | 000100001001000 | 5 | 000001000010000 | 3 |
| 123 | 000001000010000 | 4 | 000100001001001 | 0 | 000001000010000 | 4 |
| 124 | 000001000010000 | 5 | 000100001001001 | 1 | 000001000010000 | 5 |
| 125 | 000001000010001 | 0 | 000100010000000 | 3 | 000001000010001 | 0 |
| 126 | 000001000010001 | 1 | 000100010000000 | 5 | 000001000010001 | 1 |
| 127 | 000001000010010 | 1 | 000100010000000 | 4 | 000001000010010 | 1 |
| 128 | 000001000010010 | 2 | 000100010000010 | 1 | 000001000010010 | 2 |
| 129 | 000001000010010 | 3 | 000100010000010 | 2 | 000001000010010 | 3 |
| 130 | 000001000100000 | 1 | 000100010000010 | 3 | 000001000100000 | 1 |
| 131 | 000001000100000 | 3 | 000100010000100 | 1 | 000001000100000 | 3 |
| 132 | 000001000100000 | 4 | 000100010000100 | 3 | 000001000100000 | 4 |
| 133 | 000001000100000 | 5 | 000100010000100 | 4 | 000001000100000 | 5 |
| 134 | 000001000100001 | 0 | 000100010000100 | 5 | 000001000100001 | 0 |
| 135 | 000001000100001 | 1 | 000100010001000 | 1 | 000001000100001 | 1 |
| 136 | 000001000100010 | 1 | 000100010001000 | 3 | 000001000100010 | 1 |
| 137 | 000001000100010 | 2 | 000100010001000 | 4 | 000001000100010 | 2 |
| 138 | 000001000100010 | 3 | 000100010001000 | 5 | 000001000100010 | 3 |
| 139 | 000001001000001 | 0 | 000100010001001 | 0 | 000001001000001 | 0 |
| 140 | 000001001000001 | 1 | 000100010001001 | 1 | 000001001000001 | 1 |
| 141 | 000000001000100 | 1 | 000100100000100 | 1 | 000000001000100 | 1 |
| 142 | 000000001000100 | 3 | 000100100000100 | 3 | 000000001000100 | 3 |
| 143 | 000000001000100 | 4 | 000100100000100 | 4 | 000000001000100 | 4 |
| 144 | 000000001000100 | 5 | 000100100000100 | 5 | 000000001000100 | 5 |
| 145 | 000000001001000 | 1 | 000100100001000 | 1 | 000000001001000 | 1 |
| 146 | 000000001001000 | 3 | 000100100001000 | 3 | 000000001001000 | 3 |
| 147 | 000000001001000 | 4 | 000100100001000 | 4 | 000000001001000 | 4 |
| 148 | 000000001001000 | 5 | 000100100001000 | 5 | 000000001001000 | 5 |
| 149 | 000000010001000 | 1 | 000100000010001 | 0 | 000000010001000 | 1 |
| 150 | 000000010001000 | 3 | 000100000010001 | 1 | 000000010001000 | 3 |
| 151 | 000000010001000 | 4 | 000100001000010 | 1 | 000000010001000 | 4 |
| 152 | 000000010001000 | 5 | 000100001000010 | 2 | 000000010001000 | 5 |
| 153 | 000001000000000 | 4 | 000100001000010 | 3 | 000001000000000 | 4 |
| 154 | 000001000000000 | 5 | 000100010010000 | 1 | 000001000000000 | 5 |
| 155 | 000000000100000 | 1 | 000100010010000 | 3 | 000000000100000 | 1 |
| 156 | 000000000100000 | 3 | 000100010010000 | 4 | 000000000100000 | 3 |
| 157 | 000000000010000 | 1 | 000100010010000 | 5 | 010000000010000 | 1 |
| 158 | 000000000010000 | 3 | 000100010010001 | 0 | 010000000010000 | 3 |

| "3" | | "4" | | "5" | |
|---|---|---|---|---|---|
| 010000100001001 | 0 | 100000100000001 | 1 | 100010010001000 | 3 |
| 010000100001001 | 1 | 100000100001001 | 0 | 100010010001000 | 4 |
| 010000100010000 | 1 | 100000100001001 | 1 | 100010010001000 | 5 |
| 010000100010000 | 3 | 100000100010010 | 1 | 100010010001001 | 0 |
| 010000100010000 | 4 | 100000100010010 | 2 | 100010010001001 | 1 |
| 010000100010000 | 5 | 100000100010010 | 3 | 100010010010000 | 1 |
| 010000100010001 | 0 | 100000100001000 | 1 | 100010010010000 | 3 |
| 010000100010001 | 1 | 100000100001000 | 3 | 100010010010000 | 4 |
| 010000100010010 | 1 | 100000100001000 | 4 | 100010010010000 | 5 |
| 010000100010010 | 2 | 100000100001000 | 5 | 100010010010001 | 0 |
| 010000100010010 | 3 | 100000100010000 | 1 | 100010010010001 | 1 |
| 010000100100000 | 1 | 100000100010000 | 3 | 100010010010010 | 1 |
| 010000100100000 | 3 | 100000100010000 | 4 | 100010010010010 | 2 |
| 010000100100000 | 4 | 100000100010000 | 5 | 100010010010010 | 3 |
| 010000100100000 | 5 | 100000100010001 | 0 | 100100000000001 | 0 |
| 010000100100001 | 0 | 100000100010001 | 1 | 100100000000001 | 1 |
| 010000100100001 | 1 | 100000100100000 | 1 | 100100000000010 | 1 |
| 010000100100010 | 1 | 100000100100000 | 3 | 100100000000010 | 2 |
| 010000100100010 | 2 | 100000100100000 | 4 | 100100000000010 | 3 |
| 010000100100010 | 3 | 100000100100000 | 5 | 100100000000100 | 1 |
| 010001001001001 | 0 | 100000100100001 | 0 | 100100000000100 | 3 |
| 010001001001001 | 1 | 100000100100001 | 1 | 100100000000100 | 4 |
| 010001000001000 | 1 | 100000100100010 | 1 | 100100000000100 | 5 |
| 010001000001000 | 3 | 100000100100010 | 2 | 100100000001000 | 1 |
| 010001000001000 | 4 | 100000100100010 | 3 | 100100000001000 | 3 |
| 010001000001000 | 5 | 100000100100100 | 1 | 100100000001000 | 4 |
| 010001000010000 | 1 | 100000100100100 | 3 | 100100000001000 | 5 |
| 010001000010000 | 3 | 100000100100100 | 4 | 100100000001001 | 0 |
| 010001000010000 | 4 | 100000100100100 | 5 | 100100000001001 | 1 |
| 010001000010000 | 5 | 100001100000001 | 0 | 100100000010000 | 1 |
| 010001000100000 | 1 | 100001100000001 | 1 | 100100000010000 | 3 |
| 010001000100000 | 3 | 100001000000010 | 1 | 100100000010000 | 4 |
| 010001000100000 | 4 | 100001000000010 | 2 | 100100000010000 | 5 |
| 010001000100000 | 5 | 100001000000010 | 3 | 100100000010001 | 0 |
| 010000100100100 | 4 | 100001000000100 | 1 | 100100000010001 | 1 |
| 010000100100100 | 5 | 100001000000100 | 3 | 100100000010010 | 1 |
| 010000100100100 | 1 | 100001000000100 | 4 | 100100000010010 | 2 |
| 010000100100100 | 3 | 100001000000100 | 5 | 100100000010010 | 3 |
| 010001000000001 | 0 | 010000000010000 | 1 | 100100000100000 | 1 |
| 010001000000001 | 1 | 010000000010000 | 3 | 100100000100000 | 3 |

FIG.8

| INPUT WORD | TABLE OF STATUS "0" | | "1" | | "2" | |
|---|---|---|---|---|---|---|
| 159 | 000000000010000 | 4 | 000100010010001 | 1 | 010000000010000 | 4 |
| 160 | 000000000010000 | 5 | 000100010010010 | 1 | 010000000010000 | 5 |
| 161 | 000000000010001 | 0 | 000100010010010 | 2 | 010001000001001 | 0 |
| 162 | 000000000010001 | 1 | 000100010010010 | 3 | 010001000001001 | 1 |
| 163 | 000000000010010 | 1 | 000010000010000 | 1 | 010000000100000 | 1 |
| 164 | 000000000010010 | 2 | 000010000010000 | 3 | 010000000100000 | 3 |
| 165 | 000000000010010 | 3 | 000010000010000 | 4 | 010000000100000 | 4 |
| 166 | 001000001001000 | 1 | 000010000010000 | 5 | 010000000100000 | 5 |
| 167 | 001000001001000 | 3 | 000100000000100 | 1 | 010001000010001 | 0 |
| 168 | 001000001001000 | 4 | 000100000000100 | 3 | 010001000010001 | 1 |
| 169 | 001000001001000 | 5 | 000100000000100 | 4 | 010001000010010 | 1 |
| 170 | 001000001001001 | 0 | 000100000000100 | 5 | 010001000010010 | 2 |
| 171 | 001000001001001 | 1 | 000100001000001 | 0 | 010001000010010 | 3 |
| 172 | 001000010000001 | 0 | 000100001000001 | 1 | 010000001000000 | 1 |
| 173 | 001000010000001 | 1 | 000100100001001 | 0 | 010000001000000 | 3 |
| 174 | 001000010000010 | 1 | 000100100001001 | 1 | 010000001000000 | 4 |
| 175 | 001000010000010 | 2 | 000100100010010 | 1 | 010000001000000 | 5 |
| 176 | 001000010000010 | 3 | 000100100010010 | 2 | 010001000100001 | 0 |
| 177 | 001000010000100 | 1 | 000100100010010 | 3 | 010001000100001 | 1 |
| 178 | 001000010000100 | 3 | 000100000001000 | 1 | 010001000100010 | 1 |
| 179 | 001000010000100 | 4 | 000100000001000 | 3 | 010001000100010 | 2 |
| 180 | 001000010000100 | 5 | 000100000001000 | 4 | 010001000100010 | 3 |
| 181 | 001000010001000 | 1 | 000100000001000 | 5 | 010001000100100 | 1 |
| 182 | 001000010001000 | 3 | 000100000100000 | 1 | 010001000100100 | 3 |
| 183 | 001000010001000 | 4 | 000100000100000 | 3 | 010001000100100 | 4 |
| 184 | 001000010001000 | 5 | 000100000100000 | 4 | 010001000100100 | 5 |
| 185 | 001000010001001 | 0 | 000100000100000 | 5 | 010001001000000 | 1 |
| 186 | 001000010001001 | 1 | 000100010000001 | 0 | 010001001000000 | 3 |
| 187 | 001000010010000 | 1 | 000100010000001 | 1 | 010001001000000 | 4 |
| 188 | 001000010010000 | 3 | 000100000010000 | 1 | 010001001000000 | 5 |
| 189 | 001000010010000 | 4 | 000100000010000 | 3 | 010001001000001 | 0 |
| 190 | 001000010010000 | 5 | 000100000010000 | 4 | 010001001000001 | 1 |
| 191 | 001000010010001 | 0 | 000100000010000 | 5 | 010001001000010 | 1 |
| 192 | 001000010010001 | 1 | 000100100000001 | 0 | 010001001000010 | 2 |
| 193 | 001000010010010 | 1 | 000100100000001 | 1 | 010001001000010 | 3 |
| 194 | 001000010010010 | 2 | 001000000010010 | 1 | 010001001000100 | 1 |
| 195 | 001000010010010 | 3 | 001000000010010 | 2 | 010001001000100 | 3 |
| 196 | 001000100000000 | 3 | 001000000010010 | 3 | 010001001000100 | 4 |
| 197 | 001000100000000 | 5 | 000100100000000 | 3 | 010001001000100 | 5 |
| 198 | 001000100000000 | 4 | 000100100000000 | 5 | 010001001001000 | 1 |

| "3" | "4" | "5" |
|---|---|---|
| 010001000000010  1 | 010000000010000  4 | 100100000100000  4 |
| 010001000000010  2 | 010000000010000  5 | 100100000100000  5 |
| 010001000000010  3 | 010001000001001  0 | 100100000100001  0 |
| 010001000000100  1 | 010001000001001  1 | 100100000100001  1 |
| 010001000000100  3 | 010000000100000  1 | 100100000100010  1 |
| 010001000000100  4 | 010000000100000  3 | 100100000100010  2 |
| 010001000000100  5 | 010000000100000  4 | 100100000100010  3 |
| 001000001001000  1 | 010000000100000  5 | 100100000100100  1 |
| 001000001001000  3 | 010001000010001  0 | 100100000100100  3 |
| 001000001001000  4 | 010001000010001  1 | 100100000100100  4 |
| 001000001001000  5 | 010001000010010  1 | 100100000100100  5 |
| 001000001001001  0 | 010001000010010  2 | 100100001000000  1 |
| 001000001001001  1 | 010001000010010  3 | 100100001000000  3 |
| 001000010000001  0 | 010000001000000  1 | 100100001000000  4 |
| 001000010000001  1 | 010000001000000  3 | 100100001000000  5 |
| 001000010000010  1 | 010000001000000  4 | 100100001000001  0 |
| 001000010000010  2 | 010000001000000  5 | 100100001000001  1 |
| 001000010000010  3 | 010001000100001  0 | 100100001000010  1 |
| 001000010000100  1 | 010001000100001  1 | 100100001000010  2 |
| 001000010000100  3 | 010001000100010  1 | 100100001000010  3 |
| 001000010000100  4 | 010001000100010  2 | 100100001000100  1 |
| 001000010000100  5 | 010001000100010  3 | 100100001000100  3 |
| 001000010001000  1 | 010001000100100  1 | 100100001000100  4 |
| 001000010001000  3 | 010001000100100  3 | 100100001000100  5 |
| 001000010001000  4 | 010001000100100  4 | 100100001001000  1 |
| 001000010001000  5 | 010001000100100  5 | 100100001001000  3 |
| 001000010001001  0 | 010001001000000  1 | 100100001001000  4 |
| 001000010001001  1 | 010001001000000  3 | 100100001001000  5 |
| 001000010010000  1 | 010001001000000  4 | 100100001001001  0 |
| 001000010010000  3 | 010001001000000  5 | 100100001001001  1 |
| 001000010010000  4 | 010001001000001  0 | 100100010000000  3 |
| 001000010010000  5 | 010001001000001  1 | 100100010000000  5 |
| 001000010010001  0 | 010001001000010  1 | 100100010000000  4 |
| 001000010010001  1 | 010001001000010  2 | 100100010000001  0 |
| 001000010010010  1 | 010001001000010  3 | 100100010000001  1 |
| 001000010010010  2 | 010001001000100  1 | 100100010000010  1 |
| 001000010010010  3 | 010001001000100  3 | 100100010000010  2 |
| 001000100000000  3 | 010001001000100  4 | 100100010000010  3 |
| 001000100000000  5 | 010001001000100  5 | 100100010000100  1 |
| 001000100000000  4 | 010001001001000  1 | 100100010000100  3 |

FIG.9

| INPUT WORD | TABLE OF STATUS "0" | | "1" | | "2" | |
|---|---|---|---|---|---|---|
| 199 | 001000100000001 | 0 | 000100100000000 | 4 | 010001001001000 | 3 |
| 200 | 001000100000001 | 1 | 000100100010001 | 0 | 010001001001000 | 4 |
| 201 | 001000100000010 | 1 | 000100100010001 | 1 | 010001001001000 | 5 |
| 202 | 001000100000010 | 2 | 001000000000010 | 1 | 010000000100001 | 0 |
| 203 | 001000100000010 | 3 | 001000000000010 | 2 | 010000000100001 | 1 |
| 204 | 001000100000100 | 1 | 001000000000010 | 3 | 010010000000001 | 0 |
| 205 | 001000100000100 | 3 | 000100001000000 | 1 | 010010000000001 | 1 |
| 206 | 001000100000100 | 4 | 000100001000000 | 3 | 010010000000010 | 1 |
| 207 | 001000100000100 | 5 | 000100001000000 | 4 | 010010000000010 | 2 |
| 208 | 001000100001000 | 1 | 000100001000000 | 5 | 010010000000010 | 3 |
| 209 | 001000100001000 | 3 | 001000000000100 | 1 | 010010000000100 | 1 |
| 210 | 001000100001000 | 4 | 001000000000100 | 3 | 010010000000100 | 3 |
| 211 | 001000100001000 | 5 | 001000000000100 | 4 | 010010000000100 | 4 |
| 212 | 001000100001001 | 0 | 001000000000100 | 5 | 010010000000100 | 5 |
| 213 | 001000100001001 | 1 | 001000000100001 | 0 | 010010000001000 | 1 |
| 214 | 001000100010000 | 1 | 001000000100001 | 1 | 010010000001000 | 3 |
| 215 | 001000100010000 | 3 | 001000000001000 | 1 | 010010000001000 | 4 |
| 216 | 001000100010000 | 4 | 001000000001000 | 3 | 010010000001000 | 5 |
| 217 | 001000100010000 | 5 | 001000000001000 | 4 | 010010000001001 | 0 |
| 218 | 001000100010001 | 0 | 001000000001000 | 5 | 010010000001001 | 1 |
| 219 | 001000100010001 | 1 | 001000000001001 | 0 | 010010000010000 | 1 |
| 220 | 001000100010010 | 1 | 001000000001001 | 1 | 010010000010000 | 3 |
| 221 | 001000100010010 | 2 | 001000000100010 | 1 | 010010000010000 | 4 |
| 222 | 001000100010010 | 3 | 001000000100010 | 2 | 010010000010000 | 5 |
| 223 | 001000100100000 | 1 | 001000000100010 | 3 | 010010000010001 | 0 |
| 224 | 001000100100000 | 3 | 000100100100100 | 1 | 010010000010001 | 1 |
| 225 | 001000100100000 | 4 | 000100100100100 | 3 | 010010000010010 | 1 |
| 226 | 001000100100000 | 5 | 000100100100100 | 4 | 010010000010010 | 2 |
| 227 | 001000100100001 | 0 | 000100100100100 | 5 | 010010000010010 | 3 |
| 228 | 001000100100001 | 1 | 001000000010001 | 0 | 010010000100000 | 1 |
| 229 | 001000100100010 | 1 | 001000000010001 | 1 | 010010000100000 | 3 |
| 230 | 001000100100010 | 2 | 001000001000010 | 1 | 010010000100000 | 4 |
| 231 | 001000100100010 | 3 | 001000001000010 | 2 | 010010000100000 | 5 |
| 232 | 001000100100100 | 1 | 001000001000010 | 3 | 010010000100001 | 0 |
| 233 | 001000100100100 | 3 | 001000001000100 | 1 | 010010000100001 | 1 |
| 234 | 001000100100100 | 4 | 001000001000100 | 3 | 010010000100010 | 1 |
| 235 | 001000100100100 | 5 | 001000001000100 | 4 | 010010000100010 | 2 |
| 236 | 001001000000001 | 0 | 001000001000100 | 5 | 010010000100010 | 3 |
| 237 | 001001000000001 | 1 | 000100100100001 | 0 | 010010000100100 | 1 |
| 238 | 001001000000010 | 1 | 000100100100001 | 1 | 010010000100100 | 3 |

| "3" | "4" | "5" |
|---|---|---|
| 0010001000000001  0 | 010001001001000  3 | 100100010000100  4 |
| 0010001000000001  1 | 010001001001000  4 | 100100010000100  5 |
| 0010001000000010  1 | 010001001001000  5 | 100100010001000  1 |
| 0010001000000010  2 | 010000000100001  0 | 100100010001000  3 |
| 0010001000000010  3 | 010000000100001  1 | 100100010001000  4 |
| 0010001000000100  1 | 010010000000001  0 | 100100010001000  5 |
| 0010001000000100  3 | 010010000000001  1 | 100100010001001  0 |
| 0010001000000100  4 | 010010000000010  1 | 100100010001001  1 |
| 0010001000000100  5 | 010010000000010  2 | 100100010010000  1 |
| 0010001000001000  1 | 010010000000010  3 | 100100010010000  3 |
| 0010001000001000  3 | 010010000000100  1 | 100100010010000  4 |
| 0010001000001000  4 | 010010000000100  3 | 100100010010000  5 |
| 0010001000001000  5 | 010010000000100  4 | 100100010010001  0 |
| 0010001000001001  0 | 010010000000100  5 | 100100010010001  1 |
| 0010001000001001  1 | 010010000001000  1 | 100100010010010  1 |
| 0010001000010000  1 | 010010000001000  3 | 100100010010010  2 |
| 0010001000010000  3 | 010010000001000  4 | 100100010010010  3 |
| 0010001000010000  4 | 010010000001000  5 | 100100100000000  3 |
| 0010001000010000  5 | 010010000001001  0 | 100100100000000  5 |
| 0010001000010001  0 | 010010000001001  1 | 100100100000000  4 |
| 0010001000010001  1 | 010010000010000  1 | 100100100000001  0 |
| 0010001000010010  1 | 010010000010000  3 | 100100100000001  1 |
| 0010001000010010  2 | 010010000010000  4 | 100100100000010  1 |
| 0010001000010010  3 | 010010000010000  5 | 100100100000010  2 |
| 0010001000100000  1 | 010010000010001  0 | 100100100000010  3 |
| 0010001000100000  3 | 010010000010001  1 | 100100100000100  1 |
| 0010001000100000  4 | 010010000010010  1 | 100100100000100  3 |
| 0010001000100000  5 | 010010000010010  2 | 100100100000100  4 |
| 0010001000100001  0 | 010010000010010  3 | 100100100000100  5 |
| 0010001000100001  1 | 010010000100000  1 | 100100100001000  1 |
| 0010001000100010  1 | 010010000100000  3 | 100100100001000  3 |
| 0010001000100010  2 | 010010000100000  4 | 100100100001000  4 |
| 0010001000100010  3 | 010010000100000  5 | 100100100001000  5 |
| 0010001000100100  1 | 010010000100001  0 | 100100100001001  0 |
| 0010001000100100  3 | 010010000100001  1 | 100100100001001  1 |
| 0010001000100100  4 | 010010000100010  1 | 100100100010000  1 |
| 0010001000100100  5 | 010010000100010  2 | 100100100010000  3 |
| 0010010000000001  0 | 010010000100010  3 | 100100100010000  4 |
| 0010010000000001  1 | 010010000100100  1 | 100100100010000  5 |
| 0010010000000010  1 | 010010000100100  3 | 100100100010001  0 |

FIG.10

| INPUT WORD | TABLE OF STATUS "0" | | "1" | | "2" | |
|---|---|---|---|---|---|---|
| 239 | 001001000000010 | 2 | 000100100100010 | 1 | 010010000100100 | 4 |
| 240 | 001001000000010 | 3 | 000100100100010 | 2 | 010010000100100 | 5 |
| 241 | 001001000000100 | 1 | 000100100100010 | 3 | 010010001000000 | 1 |
| 242 | 001001000000100 | 3 | 001000000010000 | 1 | 010010001000000 | 3 |
| 243 | 001001000000100 | 4 | 001000000010000 | 3 | 010010001000000 | 4 |
| 244 | 001001000000100 | 5 | 001000000010000 | 4 | 010010001000000 | 5 |
| 245 | 001001000001000 | 1 | 001000000010000 | 5 | 010010001000001 | 0 |
| 246 | 001001000001000 | 3 | 001000000100000 | 1 | 010010001000001 | 1 |
| 247 | 001001000001000 | 4 | 001000000100000 | 3 | 010010001000010 | 1 |
| 248 | 001001000001000 | 5 | 001000000100000 | 4 | 010010001000010 | 2 |
| 249 | 001001000001001 | 0 | 001000000100000 | 5 | 010010001000010 | 3 |
| 250 | 001001000001001 | 1 | 001000001000001 | 0 | 010010001001001 | 0 |
| 251 | 001001000010000 | 1 | 001000001000001 | 1 | 010010001001001 | 1 |
| 252 | 001001000010000 | 3 | 001000001000000 | 1 | 010010010000000 | 3 |
| 253 | 001001000010000 | 4 | 001000001000000 | 3 | 010010010000000 | 5 |
| 254 | 001001000010000 | 5 | 001000001000000 | 4 | 010010010000000 | 4 |
| 255 | 000010000000000 | 5 | 001000001000000 | 5 | 010010000000000 | 5 |

| "3" | "4" | "5" |
|---|---|---|
| 001001000000010  2 | 010010000100100  4 | 100100100010001  1 |
| 001001000000010  3 | 010010000100100  5 | 100100100010010  1 |
| 001001000000100  1 | 010010001000000  1 | 100100100010010  2 |
| 001001000000100  3 | 010010001000000  3 | 100100100010010  3 |
| 001001000000100  4 | 010010001000000  4 | 100100100100000  1 |
| 001001000000100  5 | 010010001000000  5 | 100100100100000  3 |
| 001001000001000  1 | 010010001000001  0 | 100100100100000  4 |
| 001001000001000  3 | 010010001000001  1 | 100100100100000  5 |
| 001001000001000  4 | 010010001000010  1 | 100100100100001  0 |
| 001001000001000  5 | 010010001000010  2 | 100100100100001  1 |
| 001001000001001  0 | 010010001000010  3 | 100100100100010  1 |
| 001001000001001  1 | 010010001001001  0 | 100100100100010  2 |
| 001001000010000  1 | 010010001001001  1 | 100100100100010  3 |
| 001001000010000  3 | 010010010000000  3 | 100100100100100  1 |
| 001001000010000  4 | 010010010000000  5 | 100100100100100  3 |
| 001001000010000  5 | 010010010000000  4 | 100100100100100  4 |
| #1 | #2 | 100100100100100  5 |

1 WHEN ZERO RUN LENGTH OF
    PREVIOUS DATA IS LESS THAN 6  000010000000000  5
                         MORE THAN 7  010010000000000  5

2 WHEN ZERO RUN LENGTH OF
    PREVIOUS DATA IS OTHER THAN 7 OR 8  010010000000000  5
                                       7 OR 8  001000010000000  5

FIG.11

| CASE | ZERO RUN LENGTH ON LSB SIDE | POSSIBLE NEXT STATUS |
|---|---|---|
| 0 | 0 | 0, 1 |
| 1 | 1 | 1, 2, 3 |
| 2 | 2 ~ 6 | 1, 3, 4, 5 |
| 3 | 7, 8 | 3, 4, 5 |
| 4 | 9, 10 | 4, 5 |

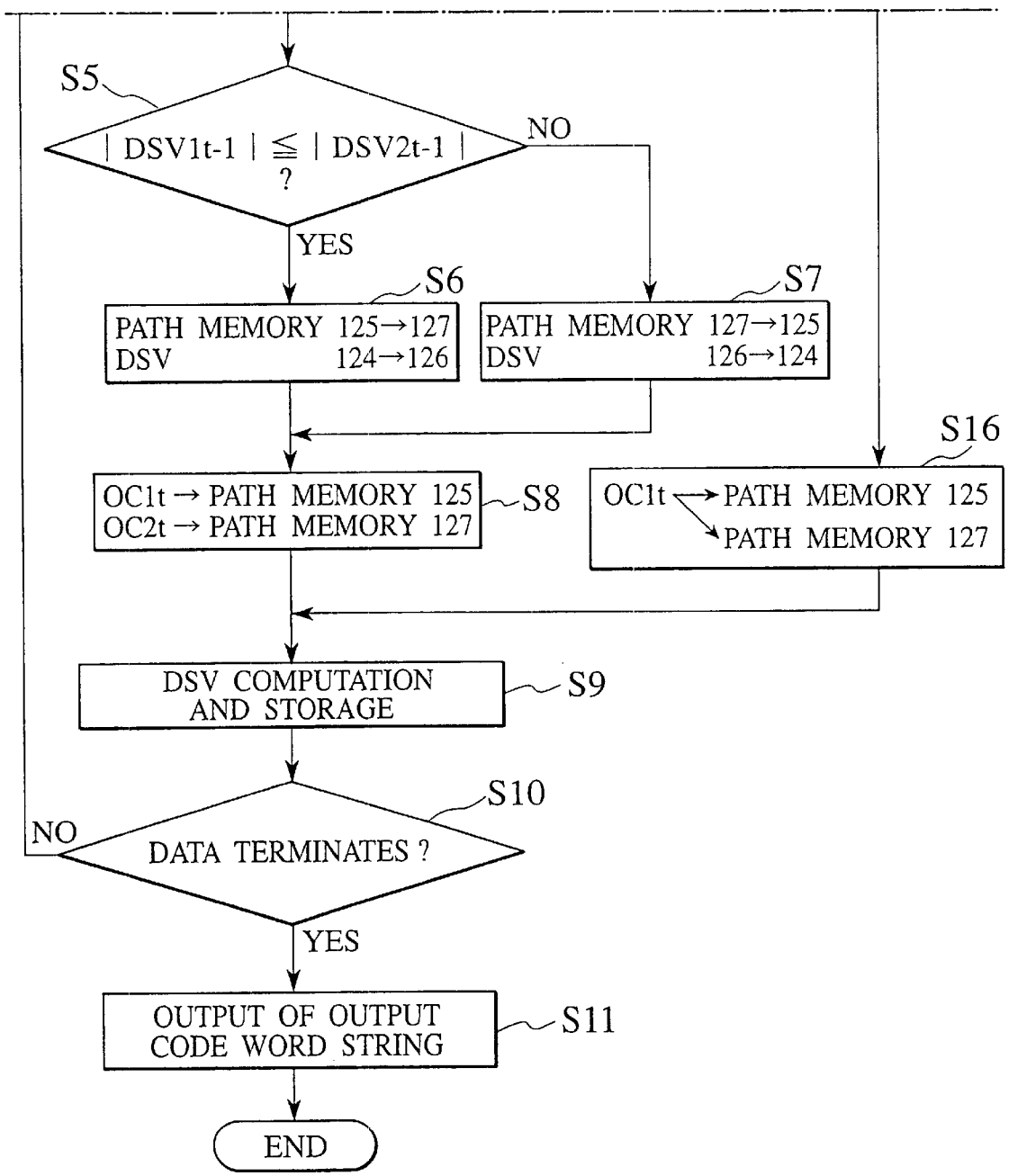

FIG.15A

| INPUT WORD | TABLE OF STATUS "0" | | "1" | | "2" | | "3" | |
|---|---|---|---|---|---|---|---|---|
| 0 | 0000000000100000 | 4 | 0010000010000000 | 4 | 0000000000100000 | 4 | 0010010000000000 | 4 |
| 1 | 0000000000100000 | 5 | 0010000010000000 | 3 | 0000000000100000 | 5 | 0010010000000000 | 5 |
| 2 | 0000000000100001 | 0 | 0000100000000001 | 0 | 0000000000100001 | 0 | 0010010000001001 | 0 |
| 3 | 0000000000100001 | 1 | 0000100000000001 | 1 | 0000000000100001 | 1 | 0010010000001001 | 1 |
| 4 | 0000000000100100 | 1 | 0000100000000010 | 1 | 0000000000100100 | 1 | 0010010000000000 | 1 |
| 5 | 0000000000100100 | 3 | 0000100000000010 | 2 | 0000000000100100 | 3 | 0010010000000000 | 3 |
| 6 | 0000000000100100 | 4 | 0000100000000010 | 3 | 0000000000100100 | 4 | 0010010000000000 | 4 |
| 7 | 0000000000100100 | 5 | 0000100000000100 | 1 | 0000000000100100 | 5 | 0010010000000000 | 5 |
| 8 | 0000000001000000 | 1 | 0000100000000100 | 3 | 0000000001000000 | 1 | 0010010000000100 | 1 |
| 9 | 0000000001000000 | 3 | 0000100000000100 | 4 | 0000000001000000 | 3 | 0010010001000100 | 3 |
| 10 | 0000000001000000 | 4 | 0000100000001000 | 5 | 0000000001000000 | 4 | 0010010001000100 | 4 |
| 11 | 0000000001000000 | 5 | 0000100000001000 | 1 | 0000000001000000 | 5 | 0010010001000100 | 5 |
| 12 | 0000000001001000 | 1 | 0000100000001000 | 3 | 0000000001001000 | 1 | 0010010001000100 | 1 |
| 13 | 0000000001001000 | 3 | 0000100000001000 | 4 | 0000000001001000 | 3 | 0010010001000100 | 3 |
| 14 | 0000000001001000 | 4 | 0000100000001000 | 5 | 0000000001001000 | 4 | 0010010001000100 | 4 |
| 15 | 0000000001001000 | 5 | 0000100000001001 | 0 | 0000000001001000 | 5 | 0010010001000100 | 5 |
| ... | ... | | ... | | ... | | ... | |

FIG.15B

| INPUT WORD | TABLE OF STATUS "0" | | "1" | | "2" | | "3" | |
|---|---|---|---|---|---|---|---|---|
| 0 | 0000000000100000 | 4 | 0010000010000000 | 4 | 0000000000100000 | 4 | 0010010000000000 | 4 |
| 1 | 0000000000100000 | 5 | 0010000100000000 | 3 | 0000000000100000 | 5 | 0010010000000000 | 5 |
| 2 | 0000000000100001 | 0 | 0000100000000001 | 0 | 0000000000100001 | 0 | 0010010000001001 | 0 |
| 3 | 0000000000100001 | 1 | 0000100000000001 | 1 | 0000000000100001 | 1 | 0010010000001001 | 1 |
| 4 | 0000000000100100 | 1 | 0000100000000010 | 1 | 0000000000100100 | 1 | 0010010000100000 | 1 |
| 5 | 0000000000100100 | 3 | 0000100000000010 | 2 | 0000000000100100 | 3 | 0010010000100000 | 3 |
| 6 | 0000000000100100 | 4 | 0000100000000100 | 3 | 0000000000100100 | 4 | 0010010000100000 | 4 |
| 7 | 0000000000100100 | 5 | 0000100000000100 | 1 | 0000000000100100 | 5 | 0010010000100000 | 5 |
| 8 | 0000000001000000 | 1 | 0000100000000000 | 3 | 0000000001000000 | 1 | 0010010000100100 | 1 |
| 9 | 0000000001000000 | 3 | 0000100000000000 | 4 | 0000000001000000 | 3 | 0010010000100100 | 3 |
| 10 | 0000000001000000 | 4 | 0000100000000100 | 5 | 0000000001000000 | 4 | 0010010000100100 | 4 |
| 11 | 0000000001000000 | 5 | 0000100000001000 | 1 | 0000000001000000 | 5 | 0010010000100100 | 5 |
| 12 | 0000000100100000 | 1 | 0000100000001000 | 3 | 0000000100100000 | 1 | 0010010000100100 | 1 |
| 13 | 0000000100100000 | 3 | 0000100000001000 | 4 | 0000000100100000 | 3 | 0010010001000000 | 3 |
| 14 | 0000001001000000 | 4 | 0000100000001000 | 5 | 0000001001000000 | 4 | 0010010001000000 | 4 |
| 15 | 0000001001000000 | 5 | 0000100000001001 | 0 | 0000001001000000 | 5 | 0010010001000000 | 5 |
| .... | | | | | | | | |

FIG.16

| INPUT WORD | TABLE OF STATUS "0" | | "1" | | "2" | | "3" | |
|---|---|---|---|---|---|---|---|---|
| 0 | 0000000000100000 | 4 | 0010000010000000 | 4 | 0000000000100000 | 4 | 0010010000000000 | 4 |
| 1 | 0000000000100000 | 5 | 0010000010000000 | 3 | 0000000000100000 | 5 | 0010010000000000 | 5 |
| 2 | 0000000100000001 | 0 | 0000100000000001 | 0 | 0000000000100001 | 0 | 0010010001001001 | 0 |
| 3 | 0000000100000001 | 1 | 0000100000000001 | 1 | 0000000000100001 | 1 | 0010010001001001 | 1 |
| 4 | 0000000100100000 | 3 | 0000100000000010 | 1 | 0000000000100100 | 1 | 0010010000100000 | 1 |
| 5 | 0000000100100000 | 4 | 0000100000000010 | 2 | 0000000000100100 | 3 | 0010010000100000 | 3 |
| 6 | 0000000001100100 | 5 | 0000100000000100 | 3 | 0000000000100100 | 4 | 0010010000100000 | 4 |
| 7 | 0000000001100000 | 1 | 0000100000000100 | 1 | 0000000000100100 | 5 | 0010010000100000 | 5 |
| 8 | 0000000001000000 | 1 | 0000100000000100 | 3 | 0000000001000000 | 1 | 0010010001000100 | 1 |
| 9 | 0000000001000000 | 3 | 0000100000000100 | 4 | 0000000001000000 | 3 | 0010010001000100 | 3 |
| 10 | 0000000001000000 | 4 | 0000100000000100 | 5 | 0000000001000000 | 4 | 0010010001000100 | 4 |
| 11 | 0000000001000000 | 5 | 0000100000001000 | 1 | 0000000001001000 | 5 | 0010010001000100 | 5 |
| 12 | 0000100001000000 | 1 | 0000100000001000 | 3 | 0000100001000000 | 1 | 0010010001000100 | 1 |
| 13 | 0000100001000000 | 3 | 0000100000001000 | 4 | 0000100001000000 | 3 | 0010010001000100 | 3 |
| 14 | 0000100001000000 | 4 | 0000100000001000 | 5 | 0000100001000000 | 4 | 0010010001000100 | 4 |
| 15 | 0000100001000000 | 5 | 0000100000001001 | 0 | 0000100001000000 | 5 | 0010010001000100 | 5 |
| .... | .... | | .... | | .... | | .... | |

FIG.17

| INPUT WORD | TABLE OF STATUS "0" | | "1" | | "2" | | "3" | |
|---|---|---|---|---|---|---|---|---|
| 0 | 00000000100000 | 4 | 00100010000000 | 4 | 00000000100000 | 4 | 00100100000000 | 4 |
| 1 | 00000000100000 | 5 | 00100010000000 | 3 | 00000000100000 | 5 | 00100100000000 | 5 |
| 2 | 0000000000001 | 0 | 00001000000001 | 0 | 0000000000001 | 0 | 00100100001001 | 0 |
| 3 | 0000000000001 | 1 | 00001000000001 | 1 | 0000000000001 | 1 | 00100100001001 | 1 |
| 4 | 0000000000100 | 1 | 00001000000010 | 1 | 00000000000100 | 1 | 00100100100000 | 1 |
| 5 | 0000000000100 | 3 | 00001000000010 | 2 | 00000000000100 | 3 | 00100100100000 | 3 |
| ... | ........ | | ........ | | ........ | | ........ | |
| 33 | 00000010100010 | 2 | 00001000100010 | 2 | 00000010100010 | 2 | 00100100100010 | 2 |
| 34 | 00000100100010 | 3 | 00001000100010 | 3 | 00000010100010 | 3 | 00100100100010 | 3 |
| 35 | 00001000100100 | 1 | 00001000100100 | 1 | 00000100100100 | 1 | 00100100100100 | 1 |
| 36 | 00001000100100 | 3 | 00001000100100 | 3 | 00000100100100 | 3 | 00100100100100 | 3 |
| 37 | 00001000100100 | 4 | 00001000100100 | 4 | 00000100100100 | 4 | 00100100100100 | 4 |
| 38 | 00001000100100 | 5 | 00001000100100 | 5 | 00000100100100 | 5 | 00100100100100 | 5 |
| ... | .... | | .... | | .... | | .... | |

MODULATION METHOD, MODULATOR, TRANSMISSION APPARATUS AND RECORDING MEDIUM

BACKGROUND OF THE INVENTION

1. Field of the Invention

The present invention relates to a modulation method, modulator, transmission apparatus and recording medium, and more particularly to a modulation method and modulator in which a p-bit input data word is converted to a q-bit (q>p) code word using plural coding tables so as to intensify coding rate accompanied by increased density and a code word string is produced by coupling the code words directly, and a transmission apparatus for transmitting the code word string and a recording medium in which the code word string is recorded.

2. Description of the Related Art

Generally, the pit length to be recorded in an optical disk has a restriction about the minimum run length (minimum pit or land length) due to optical transmission characteristic for recording and reproduction and physical restraint relating to pit generation and further, a restriction about the maximum run length (maximum pit or land length) for the reason of facilitation of clock generation. Further, because of protection of a servo band and the like, it is necessary to modulate digital signals to be recorded so as to have a suppression characteristic for low-pass components thereof.

As a conventional modulation method which satisfies these restrictions in which the minimum run length is 3T (T is a period of channel bit herein after) and the maximum run length is 11T, EFM (8 to 14 modulation) method used in compact disk (CD), EFM+ method used in digital versatile disk (DVD) and the like have been well known.

In the EFM modulation used for compact disk (CD), inputted 8-bit (1 byte) digital data is converted to 14-bit run length limited code (RLL code) which satisfies a run length restriction such that its minimum run length is 3T while its maximum run length is 11T and further, 3-bit connection bit for digital sum value (DSV) control and run length restriction rule holding is attached between the converted code words so as to generate EFM modulated signals.

Regarding the minimum run length of 3T, at least two "0"s (number d of "0") are included between logical values "1" and "1" in code words, while regarding the maximum run length of 11T, 10 "0"s maximum (number k of "0") are included between logical values "1" and "1" in code words. The 3-bit connection bit provided for DSV control and run length restriction rule holding in order to reduce DC component and low-pass component of the modulated signal is connected between the 14-bit code words, so that the EFM modulated signal can satisfy the run length restriction rule RLL(d, k)=RLL(2, 10) that the minimum run length is 3T while the maximum run length is 11T.

Next, in the EFM+ method used for digital versatile disk (DVD), inputted 8-bit digital data is converted to a 16-bit code word and by connecting these code words directly without use of any connection bit, 8 to 16 modulation is executed so as to satisfy the run length restriction rule RLL(2, 10) that the minimum run length is 3T while the maximum run length is 11T.

Further, such a modulation method which has a higher coding rate in order to achieve a higher density recording and satisfies a run length restriction rule that the minimum run length is 3T while the maximum run length is 11T has been proposed in Japanese Patent Application Laid-Open No.2000-286709 by this applicant. According to the modulation method proposed by this applicant, for example, seven coding tables are employed for an inputted digital signal (inputted data word) in order to convert the inputted digital signal to a code word. These seven coding tables have code words corresponding to the inputted digital signal and status information for selecting a coding table for encoding a next digital signal. Signals obtained by NRZI-modulating a code word based on a specific coding table for a predetermined input digital signal and a code word based on another specific coding table have opposite polarities (even/odd parities of "1" are different). Consequently, for example, it is possible to convert the 8-bit data to 15-bit code word while controlling its digital sum value (DSV).

FIG.1 shows major portions of the aforementioned seven coding tables. The seven coding tables corresponding to seven statuses, status "0" to status "6" shown in the same Figure store the code word (that is, output code word after conversion) and status information indicating a coding table for use in modulating next inputted data in order to obtain a next code word which satisfies a predetermined run length restriction rule (for example, minimum run length is 3T and maximum run length is 11T) even if it is coupled with the aforementioned code word directly, corresponding to an input word. Code words corresponding to each predetermined input word are determined such that signals obtained by NRZI-converting the respective code words have polarities opposite to each other. That is, the quantities of "1" in respective code words corresponding to a predetermined input word have an even/odd relation such that the number of "1" in one code word is even while that in the corresponding code word is odd, thereby enabling the DSV control.

Although the aforementioned 16-bit code word EFM+ method can increase the coding rate by about 6% as compared to the EFM method based on 17-bit code word including a margin bit, it is desirable to improve the coding rate further in order to achieve a higher density recording.

Accordingly, the applicant proposes a modulation method which achieves a higher coding rate than the aforementioned EFM+ method while suppressing the low-pass component of a recorded signal with allocation of the code words without use of the margin bit between the code words through the aforementioned Japanese Patent Application Laid-Open No.2000-286709. However, because the number of the coding tables affects the scale of hardware upon constructing the modulator, the conventional modulator mentioned in this publication has such a problem that the scale of the hardware is too large because the seven coding tables are employed.

SUMMARY OF THE INVENTION

Accordingly, the present invention has been achieved in views of the above described problems and an object of the invention is to provide a modulation method, modulator, transmission apparatus and recording medium capable of achieving such modulation for obtaining a q-bit (q>p) code word from a p-bit inputted data word while a predetermined run length restriction rule is satisfied, with a small scale hardware using fewer coding tables than conventionally.

Further, another object of the present invention is to provide a modulation method, modulator, transmission apparatus and recording medium capable of further suppressing low-pass components in modulated signals in the 8–15 modulation method using no margin bit between the codes, by optimizing the coding table based on information about appearance frequency of input data words so as to achieve a DSV control with higher performance.

To achieve the above object, according to a first aspect of the present invention, there is provided a modulation method for performing a modulation to obtain a q-bit code word from a p-bit input data word (q>p) using plural coding tables, wherein the plural coding tables comprise six coding tables each storing a code word and status information indicating a coding table for use in modulating a next input data word in order to obtain a next code word which satisfies a predetermined run length restriction rule even if the next code word is coupled directly with the code word, corresponding to each input data word; and in a specific coding table and another specific coding table of the six coding tables, code words stored corresponding to each predetermined input data word are determined to have an even/odd relation such that the number of "1" in a code word in the specific coding table is even while the number of "1" in a code word in the other specific coding table is odd so as to enable DSV control; and upon modulating the predetermined input data word, a code word which satisfies the predetermined run length restriction rule is outputted while the DSV control is carried out by referring to the six coding tables.

According to the first aspect, the p-bit input data can be modulated to obtainq-bit code word using fewer coding tables than conventionally necessary.

According to a second aspect of the present invention, there is provided a modulation method wherein upon performing a modulation to obtain a q-bit code word from a p-bit input data word (q>p) using plural coding tables, each coding table stores a code word and status information indicating a coding table for use in modulating a next input data word in order to obtain a next code word which satisfies a predetermined run length restriction rule even if the next code word is coupled directly with the code word, corresponding to each input data word; and in a specific coding table and another specific coding table of the plural coding tables, code words stored corresponding to each predetermined input data word are determined to have an even/odd relation such that the number of "1" in a code word in the specific coding table is even while the number of "1" in a code word in the other specific coding table is odd so as to enable DSV control; and upon modulating the predetermined input data word, a code word which satisfies the predetermined run length restriction rule is outputted while the DSV control is carried out by referring to the plural coding tables, the modulation method comprising: obtaining the appearance frequency of each input data preliminarily; replacing code words and status informations allocated corresponding to input data words of a number set up preliminarily in succession from the highest appearance frequency to a lower one in one or more coding tables of the plural coding tables, with code words and status informations allocated corresponding to other input data words in the same coding table so as to reduce a DSV value of a code word series; and modulating the input data word using the plural coding tables including the one or more coding tables each whose code word and status table are replaced.

According to the second aspect, the code words and status informations allocated corresponding to input data words of a number set up preliminarily in succession from the highest appearance frequency to a lower one in at least one coding table are replaced with other code words and status informations allocated corresponding to other input data words in the same coding table, and a code word of q bits (for example, 15 bits) obtained by modulating a p-bit (for example, 8 bits) input data word from plural coding tables including one or more coding tables each whose code word and status information are replaced is outputted under the DSV control, so that an input data word having the highest appearance frequency can be modulated to a code word expressed by repetition of shorter pit/land than conventionally.

According to a third aspect of the present invention, there is provided a modulator wherein upon performing a modulation to obtain a q-bit code word from a p-bit input data word (q>p) using plural coding tables, the plural coding tables comprise six coding tables each storing a code word and status information indicating a coding table for use in modulating a next input data word in order to obtain a next code word which satisfies a predetermined run length restriction rule even if the next code word is coupled directly with the code word, corresponding to each input data word; and in a specific coding table and another specific coding table of the six coding tables, code words stored corresponding to each predetermined input data word are determined to have an even/odd relation such that the number of "1" in a code word in the specific coding table is even while the number of "1" in a code word in the other specific coding table is odd so as to enable DSV control; and a modulated code word which satisfies the predetermined run length restriction rule is outputted while the DSV control is carried out by referring to the six coding tables, the modulator comprising: a detecting portion for detecting whether a current output code word is uniquely determined or there is any option based on the input data word and the status information determined by a preceding output code word; an address computing portion which has the six coding tables, and if a detection result from the detecting portion is presence of an option, computes plural kinds of addresses of the six coding tables and outputs plural code words corresponding to the input data word from coding tables having the respective computed addresses, while if the detection result from the detecting portion is absence of any option, computes an address of one of the six coding tables including the one or more coding tables each whose code word and status information are replaced and outputs a code word corresponding to the input data word from a coding table having the computed address; and a control/output means for selecting a path having a smallest DSV value between plural paths which accumulates respective code words outputted from the address computing portion.

According to the third aspect, the p-bit input data can be modulated to obtain q-bit code word using fewer coding tables than conventionally necessary.

Further, to achieve the above object, according to a fourth aspect of the present invention, there is provided a modulator wherein upon performing a modulation to obtain a q-bit code word from a p-bit input data word (q>p) using plural coding tables, each coding table stores a code word and status information indicating a coding table for use in modulating a next input data word in order to obtain a next code word which satisfies a predetermined run length restriction rule even if the next code word is coupled directly with the code word, corresponding to each input data word; and in a specific coding table and another specific coding table of the six coding tables, code words stored corresponding to each predetermined input data word are determined to have an even/odd relation such that the number of "1" in a code word in the specific coding table is even while the number of "1" in a code word in the other specific coding table is odd so as to enable DSV control; and a modulated code word which satisfies the predetermined run length restriction rule is outputted while the DSV control is carried out by referring to the plural coding tables, the modulator comprising: a detecting portion for detecting whether a current output code word is uniquely determined or there is any option based on the input data word and the status information determined by a preceding output code word; an address computing portion which has the plural coding tables, wherein code words and status informations allocated corresponding to input data words of a number set up preliminarily in succession from the highest appearance frequency to a lower one in one or more coding tables of the plural coding tables are replaced with code words and status informations allocated corresponding to other input data words in the same coding table so as to reduce a DSV value of a code word series, the address computing portion, if a detection result from the detecting portion is presence of an option, computing plural kinds of addresses of the plural coding tables including the one or more coding tables each whose code word and status information are replaced and outputting plural code words corresponding to the input data word from coding tables having the respective computed addresses, while if the detection result from the.detecting portion is absence of any option, computing an address of one of the plural coding tables including the one or more coding tables each whose code word and status information are replaced and outputting a code word corresponding to the input data word from a coding table having the computed address; and a control/output means for selecting a path having a smallest DSV value between plural paths which accumulates respective code words outputted from the address computing portion.

According to the fourth aspect, like the modulation according to the second aspect of the present invention, the code words and status informations allocated corresponding to input data words of a number set up preliminarily in succession from the highest appearance frequency to a lower one in one or more coding tables are replaced with code words and status informations allocated corresponding to other input data words in the same coding table, and the code word of q bits (for example, 15 bits) obtained by modulating the p-bit (for example, 8 bits) input data word from plural coding tables including one or two or more coding tables each whose code word and status information are replaced is outputted under the DSV control, so that input data word having the highest appearance frequency can be modulated to a code word expressed by repetition of shorter pit/land than conventionally.

Further, to achieve the above object, according to a fifth aspect of the present invention, there is provided a transmission apparatus wherein upon performing a modulation to obtain a q-bit code word from a p-bit input data word (q>p) using plural coding tables, the plural coding tables comprise six coding tables each storing a code word and status information indicating a coding table for use in modulating a next input data word in order to obtain a next code word which satisfies a predetermined run length restriction rule even if the next code word is coupled directly with the code word, corresponding to each input data word; and in a specific coding table and another specific coding table of the six coding tables, code words stored corresponding to each predetermined input data word are determined to have an even/odd relation such that the number of "1" in a code word in the specific coding table is even while the number of "1" in a code word in the other specific coding table is odd so as to enable DSV control; and a modulated code word which satisfies the predetermined run length restriction rule is generated while the DSV control is carried out by referring to the six coding tables; and the generated code word is transmitted successively by radio or wire, the transmission apparatus comprising: a detecting portion for detecting whether a current output code word is uniquely determined or there is any option based on the input data word and the status information determined by a preceding output code word; an address computing portion which has the six coding tables, and if a detection result from the detecting portion is presence of an option, computes plural kinds of addresses of the six coding tables and outputs plural code words corresponding to the input data word from coding tables having the respective computed addresses, while if the detection result from the detecting portion is absence of any option, computes an address of one of the six coding tables including the one or more coding tables each whose code word and status information are replaced and outputs a code word corresponding to the input data word from a coding table having the computed address; and a control/output means for selecting a path having a smallest DSV value between plural paths which accumulates respective code words outputted from the address computing portion.

According to the fifth aspect of the present invention, the p-bit input data can be modulated to obtain q-bit code word using fewer coding tables than conventionally necessary for transmission.

According to a sixth aspect of the present invention, there is provided a transmission apparatus wherein upon performing a modulation to obtain a q-bit code word from a p-bit input data word (q>p) using plural coding tables, each coding table stores a code word and status information indicating a coding table for use in modulating a next input data word in order to obtain a next code word which satisfies a predetermined run length restriction rule even if the next code word is coupled directly with the code word, corresponding to each input data word; and in a specific coding table and another specific coding table of the six coding tables, code words stored corresponding to each predetermined input data word are determined to have an even/odd relation such that the number of "1" in a code word in the specific coding table is even while the number of "1" in a code word in the other specific coding table is odd so as to enable DSV control; and a modulated code word which satisfies the predetermined run length restriction rule is generated while the DSV control is carried out by referring to the plural coding tables; and the generated code word is transmitted successively by radio or wire, the transmission apparatus comprising: a detecting portion for detecting whether a current output code word is uniquely determined or there is any option based on the input data word and the status information determined by a preceding output code word; an address computing portion which has the plural coding tables, wherein code words and status informations allocated corresponding to input data words of a number set up preliminarily in succession from the highest appearance frequency to a lower one in one or more coding tables of the plural coding tables are replaced with code words and status informations allocated corresponding to other input data words in the same coding table so as to reduce a DSV value of a code word series, the address computing portion, if a detection result from the detecting portion is presence of an option, computing plural kinds of addresses of the plural coding tables including the one or more coding tables each whose code word and status information are replaced and outputting plural code words corresponding to the input data word from coding tables having the respective computed addresses, while if the detection result from the detecting portion is absence of any option, computing an address of one of the plural coding tables including the one or more coding tables each whose code word and status information are replaced and outputting a code word corresponding to the input data word from a coding table having the computed address; and a control/output means for selecting a path having a smallest DSV value between plural paths which accumulates respective code words outputted from the address computing portion.

Further to achieve the above object, according to a seventh aspect of the present invention, there is provided a recording medium for recording an NRZI-converted code word obtained by NRZI-converting a code word of q bits obtained by modulating p-bit input data word (q>p) according to six coding tables while carrying out a DSV control; each coding table storing a code word and status information indicating a coding table for use in modulating a next input data word in order to obtain a next code word which satisfies a predetermined run length restriction rule even if the next code word is coupled directly with the code word, corresponding to each input data word; in a specific coding table and another specific coding table of the six coding tables, code words stored corresponding to each predetermined input data word being determined to have an even/odd relation such that the number of "1" in a code word in the specific coding table is even while the number of "1" in a code word in the other specific coding table is odd so as to enable DSV control.

According to an eighth aspect of the present invention, there is provided a recording medium for recording an NRZI-converted code word obtained by NRZI-converting a code word of q bits obtained by modulating p-bit input data word (q>p) according to six coding tables while carrying out a DSV control; each coding table storing a code word and status information indicating a coding table for use in modulating a next input data word in order to obtain a next code word which satisfies a predetermined run length restriction rule even if the next code word is coupled directly with the code word, corresponding to each input data word; in a specific coding table and another specific coding table of the six coding tables, code words stored corresponding to each predetermined input data word being determined to have an even/odd relation such that the number of "1" in a code word in the specific coding table is even while the number of "1" in a code word in the other specific coding table is odd so as to enable DSV control, wherein code words and status informations allocated corresponding to input data words of a number set up preliminarily in succession from the highest appearance frequency to a lower one in one or more coding tables of the plural coding tables are replaced with code words and status informations allocated corresponding to other input data words in the same coding table so as to reduce a DSV value of a code word series, and a code word of q bits obtained by modulating p-bit input data word (q>p) using the plural coding tables including the one or more coding tables each whose code word and status table are replaced is NRZI-converted and recorded.

According to the eighth aspect of the present invention, it is possible to provide the recording medium in which the input data words of a number set up preliminarily from the highest appearance frequency to a lower one are recorded as code words expressed by repetition of shorter pit/land than conventionally.

The nature, principle and utility of the invention will become more apparent from the following detailed description when read in conjunction with the accompanying drawings.

BRIEF DESCRIPTION OF THE DRAWINGS

In the accompanying drawings:

FIG. 1 is a diagram showing an example of major parts of seven coding tables for use in a conventional modulation method and modulator;

FIG. 4 is a diagram (No. 1) showing an example of six coding tables according to the present invention;

FIG. 5 is a diagram (No. 2) showing an example of six coding tables according to the present invention;

FIG. 6 is a diagram (No. 3) showing an example of six coding tables according to the present invention;

FIG. 7 is a diagram (No. 4) showing an example of six coding tables according to the present invention;

FIG. 8 is a diagram (No. 5) showing an example of six coding tables according to the present invention;

FIG. 9 is a diagram (No. 6) showing an example of six coding tables according to the present invention; and FIG. 10 is a diagram (No. 7) showing an example of six coding tables according to the present invention;

FIG. 11 is a diagram showing five cases of possible next coding tables with respect to the plural coding tables shown in FIGS. 4 to 10;

FIGS. 15A, 15B are explanatory diagrams of the first mode about code word replacement in the coding table of the present invention;

FIG. 16 is an explanatory diagram of the second mode of code word replacement in the coding table of the present invention;

FIG. 17 is an explanatory diagram of the third mode about code word replacement in the coding table of the present invention;

DESCRIPTION OF THE PREFERRED EMBODIMENTS

Figure 2:
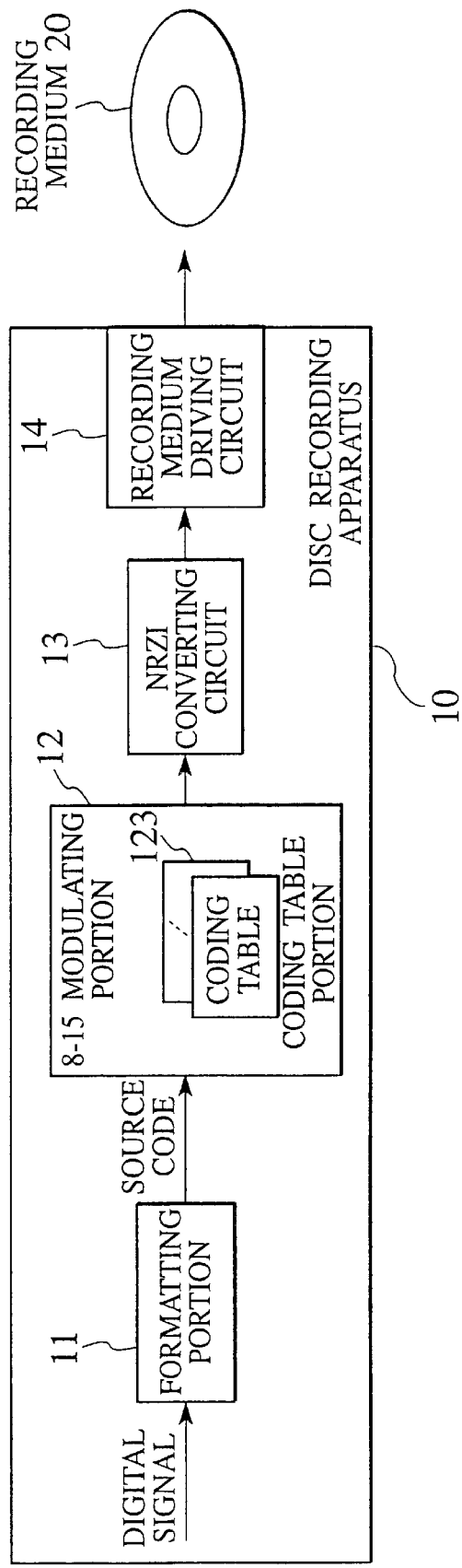
FIG. 2 is a block diagram of a disk recording unit to which a first embodiment of the modulation method and modulator of the present invention are applied.

Next, the preferred embodiments of the present invention will be described with reference to the accompanying drawings. FIG. 2 is a block diagram of a disk recording apparatus employing the modulation method and modulator according to a first embodiment of the present invention. Referring to FIG. 2, the disk recording apparatus 10 comprises a formatting portion 11, a 8–15 modulating portion 12, a NRZI converting circuit 13 and a recording medium driving circuit 14. This apparatus records digital signals relating to information about image and voice in a recording medium 20.

Digital signal relating to information about image and voice is inputted to the formatting portion 11 with a control signal or the like, which is to be recorded together and after an error correcting code, a synchronous signal and the like are attached, converted to a control format matching a recording format of the recording medium 20 and then outputted to the 8–15 modulating portion 12 as a source code.

The 8–15 modulating portion 12 has a coding table 123 comprised of plural coding tables for coding an inputted source code (input data word) and for every 8 bits of the source code (input data word), converts that 8-bit source code to 15 bits in correspondence to the plural coding tables composing the coding table 123 and outputs successively.

A signal (code word) outputted from the 8–15 modulating portion 12 is inputted to the NRZI converting circuit 13 and subjected to NRZI conversion. After that, its result is supplied to the recording medium driving circuit 14, which records it into a recording medium 20 such as an optical disk. At this time, the recording signal obtained in the above way is a signal whose coding rate is increased accompanied by increased recording density in the recording medium 20.

Figure 3:
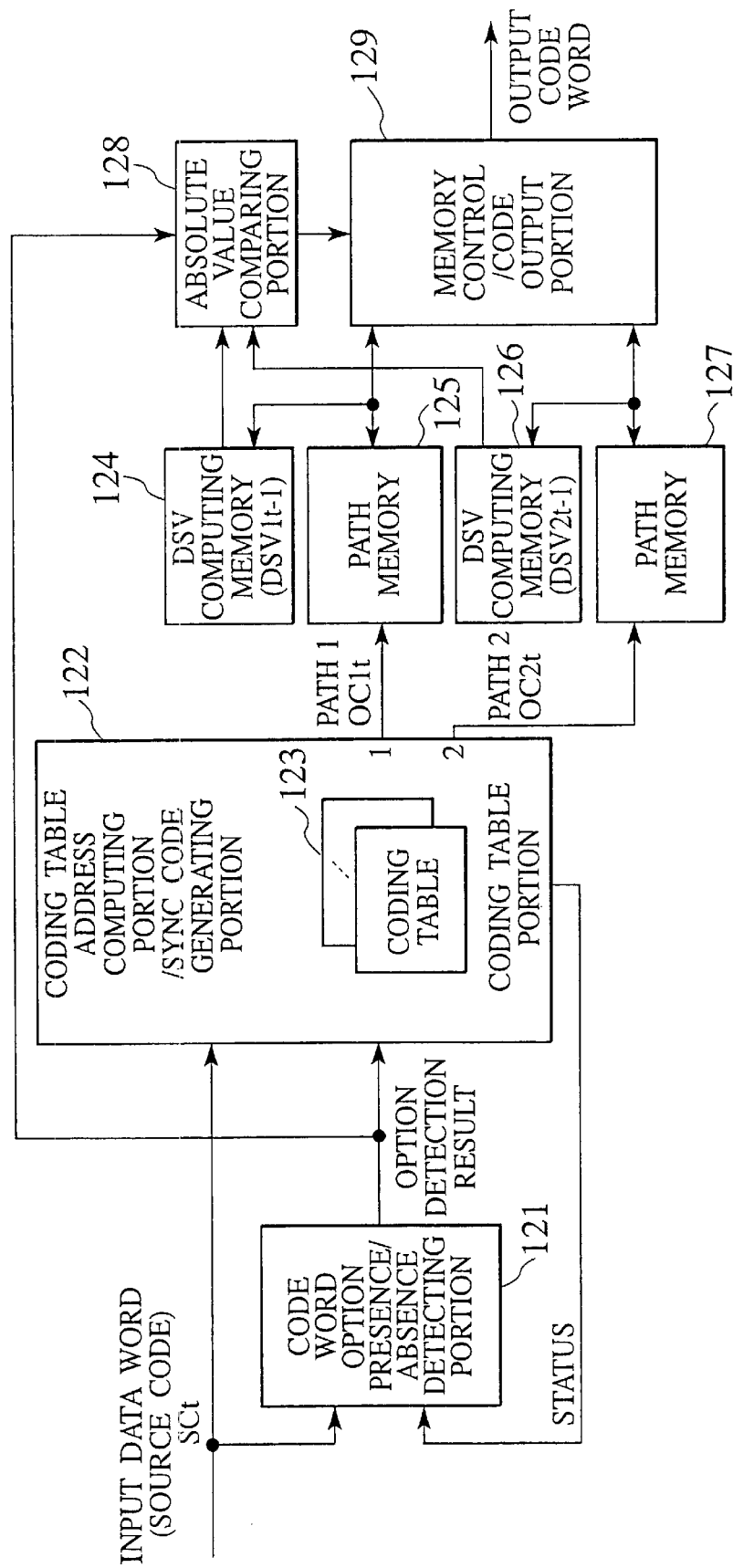
FIG. 3 is a block diagram of an embodiment of the modulator according to the present invention, composing the 8–15 modulating portion shown in FIG. 2.

FIG.3 is a block diagram of an embodiment of the 8–15 modulating portion 12 shown in FIG. 2. The 8–15 modulating portion 12 comprises a code word option absence/presence detecting portion 121, a coding table address computing portion/sync code generating portion 122 having a coding table portion 123, first/second path memories 125, 127, first/second DSV computing memories 124, 126, an absolute value comparing portion 128, and a memory control/code output portion 129. Meanwhile, although FIG. 3 shows a case where two path memories for storing a code temporarily are provided, the present invention can be applied to also a case where more path memories are provided.

Prior to description of the operation of FIG. 3, the coding table 123, which is used when the coding table address computing portion/sync code generating portion 122 compute, will be described first of all. This coding table portion 123 is comprised of six coding tables and corresponding to the input data word, stores code words (that is, output code words after conversion) and status information indicating coding tables for use in modulating a next input data word in order to obtain a next code word, which even if it is coupled directly with the aforementioned code word, satisfies a predetermined run length restriction rule (for example, minimum run length 3T, maximum run length 11T).

The number of "1" in each code word corresponding to each predetermined input word in a specific coding table and the number of "1" in each corresponding code word in another specific coding table have an even/odd relation such that one is even while the other is odd, thereby enabling the DSV control.

FIGS. 4 to 10 show examples of six coding tables about status "0" to "5" composing the coding table portion 123. These six coding tables are provided respectively corresponding to six statuses, status "0" to "5" for converting 8-bit input word to 15-bit code word. Each table stores an input word and status information indicating a coding table for use in modulating a next input data word in order to obtain a next code word, which even if it couples an output code word after conversion directly with another code word, satisfies a predetermined run length restriction rule.

Referring to the coding tables in FIGS. 4 to 10, the input word is expressed with decimal number and output code word after conversion is expressed with binary number (15 bits). The status information (coding table number) indicating the coding table for use in modulating next input data word in order to obtain the next code word which even if it couples directly with the preceding output word, satisfies the predetermined run length restriction rule, is expressed with a number attached to the right of each output code word.

For example, if coding table of the status "0" in FIG. 4 is referred to, it is evident that input word "0" corresponds to status information "4", input word "1" corresponds to status information "5" and input word "2" corresponds to status information "0". Therefore, when the input word "0" is modulated (coded) using a coding table of the status "0", the next input word is modulated using the coding table of the status "4".

The aforementioned six coding tables are set such that each time an input data word SCt is inputted, it is converted to 15-bit code words while satisfying the run length restriction rule that the minimum run length is 3T while the maximum run length is 11T. At this time, as described about the prior art, regarding the minimum run length of 3T, at least two "0"s are included between logical values "1" and "1" in each code word, while regarding the maximum run length of 11T, 10 "0"s maximum are included between logical values "1" and "1" in each code word, so that the rung length restriction rule RLL(d, k)=RLL(2, 10) is satisfied while a code word string composed by coupling code words directly satisfies the run length restriction rule RLL(2, 10).

In the aforementioned coding tables, as shown in FIG. 11, status which can be adopted by a next coming coding table can be distinguished to five cases, case 0 to case 4 depending on the zero run length on LSB side (lower bit side) in a previously outputted 15-bit code word.

Code words in a specific coding table and another specific coding table of the above-described six coding table are determined such that the two 15-bit code words stored corresponding to each predetermined input word SCt have an even/odd relation such that if the number of "1" in the one code word in the specific coding table is even (or odd), the number of "1" in the other code word in the other specific coding table is odd (or even), thereby enabling the DSV control, and thus when respective signals obtained by NRZI-converting the respective code words are DSV-controlled, the polarities of DSV values of the respective signals are opposite to each other, namely one is + while the other is −.

As described above, the first to third modes have been established as modes that the code word is replaced to be able to obtain a smaller absolute DSV value (equivalent to a direction in which the DSV value approaches 0) between a code word in a specific coding table corresponding to a predetermined input data word SCt and a code word in other specific coding table corresponding to the same predetermined input data SCt as described before. Consequently, if the first to third modes apply, it is determined that there is "an option" with respect to a predetermined input data word SCt and in other case, it is determined that there is "no option" with respect to the input data word SCt.

According to the first mode, when a specific coding table is assumed to be the coding table of status "0" while another specific coding table is assumed to be the coding table of status "3", respective signals obtained by NRZI-converting respective output code words from the coding tables of status "0" and "3", corresponding to input data words "0" to "38" have polarities opposite to each other in terms of the DSV value (even/odd parities of the number "1" contained in the code words are different from each other). However, as indicated in the DSV control flow chart upon 8 to 15 modulation in FIG. 13 described later, considering modulation time, each output code word in the coding table of status "0" corresponding to input data word "0" to "38" when the status information "0" is detected is set up to be replaceable with each output code word in the coding table of status "3" corresponding to input data words "0" to "38" and also the run length restriction rule can be maintained even if the code words are replaced and further the decoding is enabled.

This will be described in detail with reference to sections (a) and (b) in FIG. 12. When as shown in (a) in FIG. 12, for example, input data "16" is converted to a code word {000000001001001} using the coding table of status "2", the coding table of status "0" is specified as a next coding table depending on status information as evident from FIG. 4. Then, if the status information "0" is detected and the input data word to be inputted next, for example, "6" is converted to a code word {000000000100100} using the coding table of status "0", the number of "1" in the code word {000000000100100} after this conversion is two or even.

Figure 12:
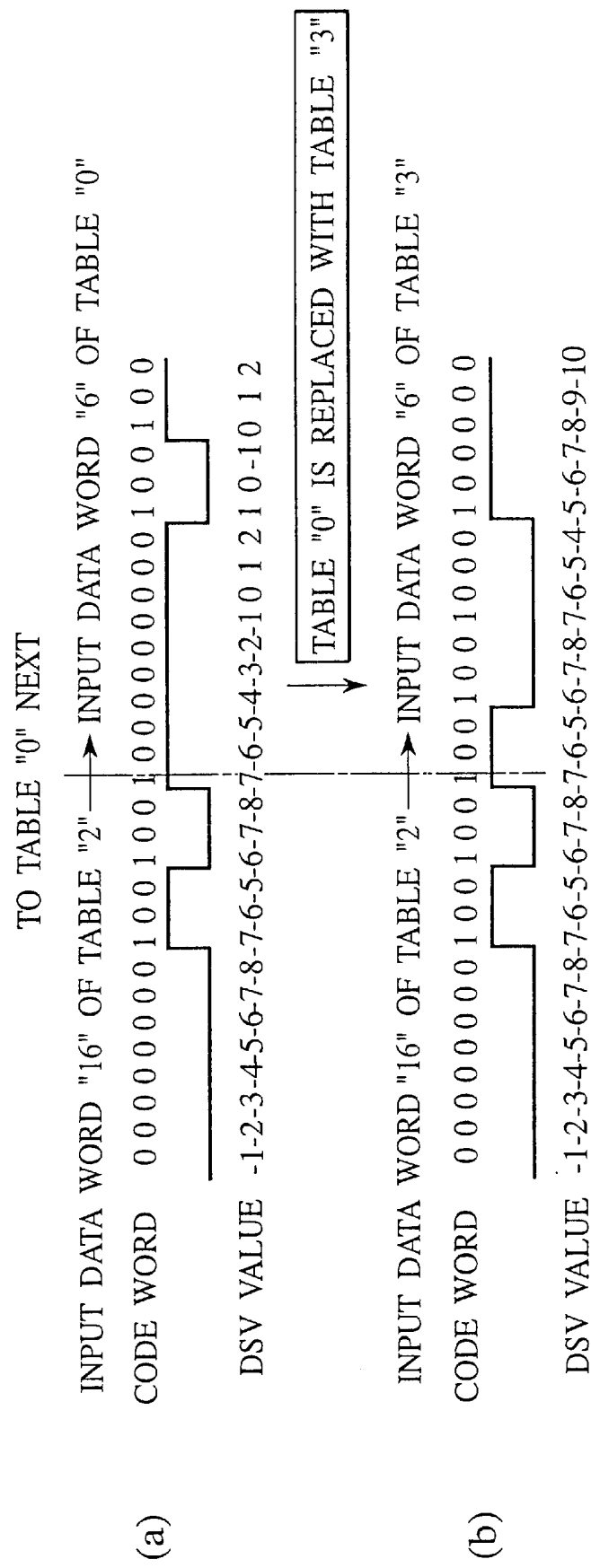
FIG. 12 is a diagram for explaining a case where a specific coding table in the plural coding tables is replaced with another specific coding table for an input data word.

On the other hand, when the input data word "16" is converted to the code word {000000001001001} using the coding table of status "2" as shown in (b) in FIG. 12, the coding table of status "0" is specified as a next coding table depending on status information as evident from FIG. 4. However, because this coding table is set up to be replaceable with the coding table of status "3" as described previously, if input data word "6" to be inputted next is converted to a code word {001001000100000} using the coding table of status "3" shown in FIG. 4, the number of "1" in this code word {001001000100000} is three or odd. Therefore, the coding table of status "0" and the coding table of status "3" with respect to input data "6" have an even/odd relation with respect to the number of After that, NRZI conversion is carried out to code word strings shown in (a), (b) in FIG. 12. Here, because the NRZI conversion carries out modulation by inverting the polarity at bit "1" while not inverting the polarity at bit "0" as well known, respective signals are obtained as shown in (a), (b) in FIG. 12.

After that, the DSV values are compared in order to make excellent DSV control upon each signal obtained by NRZI-converting the code word strings of (a), (b) in FIG. 12 and then, a smaller absolute value in terms of the DSV value is selected. This DSV value is an accumulated value from a start point of each signal obtained by the NRZI conversion with the value of bit "1" as +1 and the value of bit "0" as −1, as well known. In case of (a) in FIG. 12, the DSV value is +2 while in case of (b) in FIG. 12, the DSV value is −10, so that the polarities of the DSV values of the two cases are opposite. Then, even if the coding tables are replaced, the run length restriction rule can be maintained and further, decoding is enabled. Meanwhile, as for the examples of (a), (b) in FIG. 12, because the case of (a) in FIG. 12 provides a smaller absolute value in terms of the DSV value, this case should be selected. Usually, the DSV value changes depending on the status since before.

According to the second mode, when a specific coding table is assumed to be the coding table of status "2" while other specific coding table is assumed to be the coding table of status "4", input data words "0" to "11" and "26" to "47" in each of the coding tables of the status "2" and "4" have an even/odd relation with respect to the number of "1" like the above case. As indicated in the DSV control flow chart upon 8–15 modulation in FIG. 13, considering modulation time, each output code word in the coding table of status "2" corresponding to input data words "0" to "11" and "26" to "47" when the status information "2" is detected is set up to be replaceable with each output code word in the coding table of status "4" corresponding to input data words "0" to "11" and "26" to "47" and the run length restriction rule can be maintained even if the code words are replaced and further the decoding is enabled.

According to the third mode, regarding the coding table of status "3", when the zero run length on the LSB side of a previous output code word is 2 to 6 and the input data word SCt is less than "156", it is also applicable as far as the run length restriction rule is satisfied even if a next code word is replaced with an output code word in the coding table of status "0".

The coding table portion 123 carries out the 8–15 modulation so as to satisfy the run length restriction rule RLL(d, k)=RLL(2, 10) that the minimum run length is 3T while the maximum run length is 11T when converting the input data word SCt of bit number p=8 to a code word of bit number q=15 according to each rule at the time of coding as described previously.

Next, the operation of FIG. 3 will be described. First, an initial table address (initial value of status information of the coding table portion 123) is selected to a sync code generated by the coding table address computing portion/synchronous signal generating portion 122. Next, if an input data word SCt of 8 bits is inputted, the code word option presence/absence detecting portion 121 detects whether or not the output code word corresponding to this input data word SCt belongs to anyone of the first to third modes described previously and whether or not there is any option for the DSV control, based on status information determined by a preceding output code word (selected initial value) supplied from the coding table address computing portion/sync code generating portion 122. Or it detects whether it is other than the first to third modes while there is no option so that the code word is determined naturally and outputs its detection result to the coding table address computing portion/sync code generating portion 122 and the absolute value comparing portion 128. Then, the coding table address computing portion/sync code generating portion 122 calculates an address of the coding table portion 123 corresponding to a detection result of "there is an option" or "there is no option" from the code word option presence/absence detecting portion 121.

That is, the code word option presence/absence detecting portion 121 outputs a detection result of "there is an option" when a mode is the first mode described previously, namely, the status information supplied from the coding table address computing portion/sync code generating portion 122 is the status "0" and the input data word SCt is "0"–"38". At this time, the coding table address computing portion/sync code generating portion 122 reads out an output code word OC1t corresponding to an input data word SCt in the coding table of status "0" in the coding table portion 123, and it reads out an output code word OC2t corresponding to the input data word SCt in the coding table of status "3".

Also, the code word option presence/absence detecting portion 121 outputs a detection result of "there is an option" also when a mode is the second mode described above, namely, the status information supplied from the coding table address computing portion/sync code generating portion 122 is the status "2" and the input data word SCt is in a range of "0" to "11" or "26" to "47". At this time, the coding table address computing portion/sync code generating portion 122 reads out an output code word OC1t corresponding to an input data word SCt in the coding table of status "2" in the coding table portion 123, and it reads out an output code word OC2t corresponding to the input data word SCt in the coding table of status "4".

Further, the code word option presence/absence detecting portion 121 outputs a detection result of "there is an option" also when a mode is the third mode described previously, namely, status information supplied from the coding table address computing portion/sync code generating portion 122 is of status "3", the zero run length on the LSB side of a previous output code word is 2 to 6, and the coding rule is satisfied even if a next code word is replaced with an output code word in the coding table of status "0". At this time, the coding table address computing portion/sync code generating portion 122 reads out an output code word OC1t corresponding to an input data word SCt in the coding table of status "3" in the coding table portion 123, and it also reads out an output code word OC2t corresponding to the input data word SCt in the coding table of status "0".

As described above, if the detection result of the code word option presence/absence detecting portion 121 is "there is an option", two addresses are calculated from the coding table address computing portion/sync code generating portion 122. Thus, in this case, the coding table portion 123 outputs two kinds of code words by a time division processing and the like. Of the two kinds of the code words outputted from the coding table portion 123, one is inputted to the path memory 125 as the output code word OC1t of path "1" while the other is inputted to the path memory 127 as the output code word OC2t of path "2".

Under conditions other than the first to third modes described previously, the code word option presence/absence detecting portion 121 supplies a detection result of "there is no option" (uniquely determined) to the coding table address computing portion/sync code generating portion 122. The coding table address computing portion/sync code generating portion 122 calculates an address of the coding table portion 123 based on the detection result from the code word option presence/absence detecting portion 121.

That is, because when the detection result of the code word option presence/absence detecting portion 121 is "there is no option (uniquely determined)", the address calculated by the coding table address computing portion/sync code generating portion 122 is singular and therefore, an output code word corresponding to this address is read out from the coding table portion 123 and then, the same output code words are inputted to the path memories 125, 127.

At this time, the code word string LOC1t−1 inputted to the path memory 125 after an output code word is previously outputted from that path memory is accumulated in that path memory 125, and the code word string LOC2t−1 inputted to the path memory 127 after an output code word is previously outputted form that path memory is accumulated in that path memory 127.

A DSV value (DSV1t−1) obtained from all output words outputted before and the code word string accumulated in the path memory 125 is stored in the DSV computing memory 124, and a DSV value (DSV2t−1) obtained from all output code words outputted before and the code word string accumulated in the path memory 127 is stored in the DSV computing memory 126.

On the other hand, the absolute value comparing portion 128 compares |DSV1t−1|, which is an absolute value of total sum of the DSVs from the DSV computing memory 124 up to now with |DSV2t−1|, which is an absolute value of total sum of the DSVs from the DSV computing memory 126 up to now in terms of size, and outputs a comparison result to the memory control/code output portion 129.

The memory control/code output portion 129, when a comparison result inputted from the absolute value comparing portion 128 is |DSV1t−1|<|DSV2t−1|, outputs the previous output code word string LOC1t−1 stored in the path memory 125 as a selected output code word, and also outputs it to the path memory 127 to rewrite data therein, and further stores DSV1t−1 stored in the DSV computing memory 124 whose absolute DSV value is smaller into the DSV computing memory 126 to rewrite memory content therein.

On the contrary, the memory control/code output portion 129, when a comparison result inputted from the absolute value comparing portion 128 is |DSV1t−1|≧|DSV2t−1|, outputs the previous output code word string LOC2t−1 stored in the path memory 127 as a selected output code word, and also outputs it to the path memory 125 to rewrite data therein, and further stores DSV2t−1 stored in the DSV computing memory 126 whose absolute DSV value is smaller into the DSV computing memory 124 to rewrite memory content therein.

After that, the output code word of path "1" is stored in the path memory 125 and then, the DSV including the output code word OC1t is computed with the DSV computing memory 124 and stored therein. Further, the output code word OC2t of path "2" is stored in the path memory 127 and the DSV including the output code word OC2t is computed with the DSV computing memory 126 and stored therein. Meanwhile, if the detection result of the code word option presence/absence detecting portion 121 is "there is no option", the output code words from the path "1" and path "2" are equal to each other.

The above-described operation is repeated until input data word fails and by outputting all output code words accumulated in the path memory 125 or 127 through the memory control/code output portion 129 finally, DSV-controlled output code word, which satisfies the run length restriction rule from 3T to 11T after the NRZI conversion can be outputted.

Figure 13:
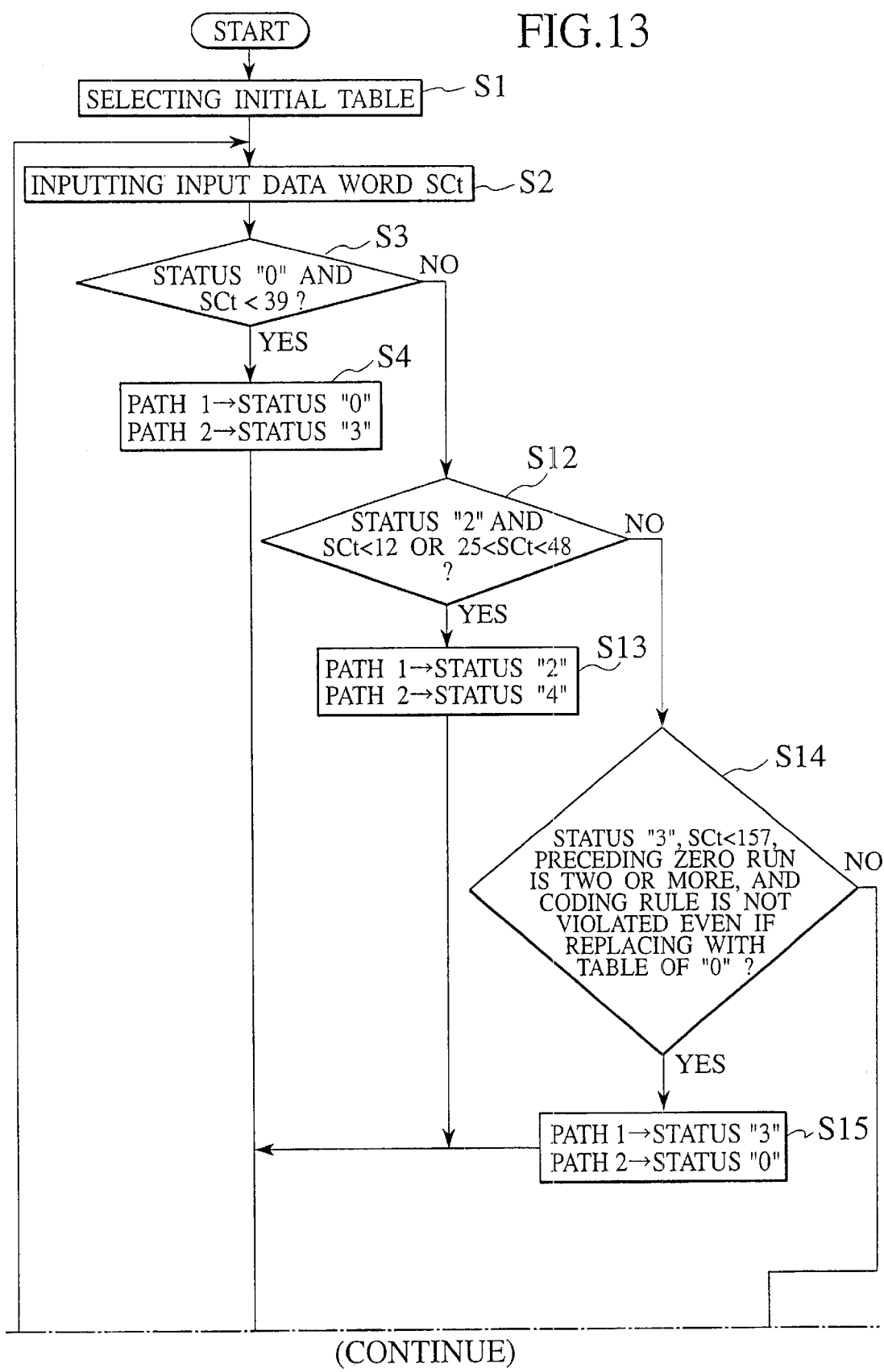
FIG. 13 is a flow chart for explaining operation of the DSV control according to an embodiment of the modulation method of the present invention.

Next, operation of the 8–15 modulating portion 12 will be described further in detail with reference to a flow chart of the DSV control shown in FIG. 13. First, an initial table (initial value of option in the coding table portion 123) is selected with respect to input data word SCt such as synchronous signal (step S1).

Next, if the input data word of 8 bits is inputted (step S2), the code word option presence/absence detecting portion 121 detects whether a current output code word is uniquely determined or there is any option based on a status determined by the input data word SCt and a preceding output code word (selected initial value at an initial state) supplied from the coding table address computing portion/sync code generating portion 122 (step S3, step S12, step S14) and outputs its detection result to the coding table address computing portion 122 and the absolute value comparing portion 128.

If paying attention to the status "0" and status "3" in the coding table shown in FIGS. 4 to 10, according to the first mode, the output code words corresponding to the input data words "0" to "38" of the output code words of the status "3" can keep the coding rule even if they are replaced with the output code words of the status "0" and can be decoded. Further, if paying attention to the status "2" and the status "4", according to the second mode, the output code words corresponding to the input data words "0" to "11" and "26" to "47" of the output code words of the status "4" can keep the coding rule even if they are replaced with the output code words of the status "2" and can be decoded.

According to the third mode, regarding the coding table of the status "3", as a condition the zero run length on the LSB side of a previous output code word is 2–6 and a next output code word exists in a range not violating a coding rule even if it is replaced with an output code word in the coding table of status "0", if the zero run (zero run length on the LSB side of the previous output code word) is more than 2 and the input data word is less than 156, then the coding rule can be kept and further decoding is enabled.

Here, code words replaceable with each other in the first to third modes are determined such that they have an even/odd relation such that the number of "1" in the one code word stored corresponding to a predetermined input data word is even while the number of "1" in the other code word stored corresponding thereto is odd, thereby enabling a DSV control. Accordingly, if a condition which matches any of the first to third modes arises, plural output code words can be adopted so that the DSV control is enabled by selecting an optimum output code word using the DSV value from the path "1" and path "2".

Then, first, the code word option presence/absence detecting portion 121 detects whether there is an option based on the first mode. That is, the code word option presence/absence detecting portion 121 determines whether or not the status supplied from the coding table address computing portion/sync code generating portion 122 is of the status "0" while the input data word SCt is less than 39 (step S3) and if this condition is satisfied, it outputs a detection result of "there is an option". Consequently, the coding table address computing portion/sync code generating portion 122 reads out an output code word OC1t corresponding to the input data word SCt in the coding table of status "0" from the coding table portion 123 and at the same time, reads out an output code word OC2t corresponding to the input data word SCt in the coding table of status 3 (step S4).

Then, respective absolute values |DSV| of the DSVs (total sum of the DSVs) stored in the DSV computing memories 124, 126 are compared by the absolute value comparing portion 128 (step S5). If the absolute value |DSV1t−1| of the DSV1t−1 form the DSV computing memory 124 is not larger than the absolute value |DSV2t−1| of the DSV2t−1 from the DSV computing memory 126, previous output code words accumulated in the path memory 125 are outputted to the path memory 127 to rewrite data therein. At the same time, the DSV computing memory 126 is rewritten with the DSV1t−1 stored in the DSV computing memory 124 (the content of the DSV computing memory 126 is turned to DSV1t−1)(step S6).

If as a result of comparison in step S5, the absolute value |DSV2t−1| of the DSV2t−1 from the DSV computing memory 126 is smaller than the absolute value DSV1t−1 of the DSV1t−1 from the DSV computing memory 124, previous output code words accumulated in the path memory 127 are outputted to the path memory 125 to rewrite data therein. At the same time, the DSV computing memory 124 is rewritten with the DSV2t−1 stored in the DSV computing memory 126 (the content of the DSV computing memory 124 is turned to DSV2t−1)(step S7).

After processing in step S6 or S7, the output code word OC1t of the path "1" is additionally stored in the path memory 125 and the output code word OC2t of the path "2" is additionally stored in the path memory 127 (step S8). Then, the DSV of the path "1" including the output code word OC1t is computed with the DSV computing memory 124 and the DSV of the path "2" including the output code word OC2t is computed with the DSV computing memory 126 (step S9).

Subsequently, whether or not the input data word terminates is determined (step S10) and if there is a next input data, the processing returns to step S2, in which the above-described operation is repeated again. If there is no next input data word, a data string of the output code words stored in the path memory 125 (or path memory 127) is outputted from the memory control/code output portion 129 (step S11).

On the other hand, if in the aforementioned step S3, the code word option presence/absence detecting portion 121 determines that the status supplied from the coding table address computing portion/sync code generating portion 122 is not of the status "0" or that the input data word SCt is not less than "39", it further determines whether there is an option based on the second mode, that is, the status is of the status "2" and the input data word SCt is within a range below "12" or more than "25". and less than "48" (step S12).

If it is determined that there is an option based on the second mode, a detection result of "there is an option" is outputted from the code word option presence/absence detecting portion 121 and consequently, the coding table address computing portion 122 reads out an output code word OC1t corresponding to the input data word SCt in the coding table of status "2" from the coding table portion 123 and at the same time, reads out an output code word OC2t corresponding to the input data word SCt in the coding table of status "4" (step S13). After that, processings in the aforementioned steps S5 to S11 are carried out.

If it is determined that there is no option based on the second mode in the step S12, the code word option presence/absence detecting portion 121 determines whether or not there is an option based on the third mode, that is, whether or not a preceding zero run (zero run length on the LSB side of a previous output code word) is 2 or more, the input data word SCt is below "157", and in case where a code word has a next output code word selected from the coding table of status "3" which is a status to be transferred next, an output code word in the coding table of status "3" is replaceable with an output code word in the coding table of status "0" without violating the coding rule (step S14).

If it is determined that the aforementioned condition of the third mode is satisfied in step S14, the code word option presence/absence determining portion 121 outputs a detection result of "there is an option" and consequently, the coding table address computing portion/sync code generating portion 122 reads out an output code word OC1t corresponding to the input data word SCt in the coding table of status "3" from the coding table portion 123 and at the same time, reads out an output code word OC2t corresponding to the input data word SCt in the coding table of status "0" (step S15). After that, processings in the steps S5 to S11 are carried out.

If it is determined that the condition based on the third mode is not satisfied in step S14, a detection result of "there is no option" is outputted from the code word option presence/absence detecting portion 121 and consequently, the coding table address computing portion/sync code generating portion 122 reads out an output code word corresponding to the input data word SCt from the coding table portion 123 and outputs it to both two path memories 125 and 127, which hold it (step S16). In this case, values of the output code words OC1t, OC2t of the paths "1", "2" are equal. After that, processings of the aforementioned steps S9 to S11 are carried out.

If a detection result of "there is no option" is outputted from the code word option presence/absence detecting portion 121, only accumulation into the path memories 125, 127 and DSV computation and updating in the DSV computing memories 124, 126 are carried out until a detection result of "there is an option" is produced, without comparing the absolute value of the DSV or selecting the path.

If the 15-bit output code word coded in the above described way is NRZI-converted, this NRZI-converted signal is a signal which is recorded in a recording medium such as an optical disk in a high density, with satisfying the rule that the minimum run length is 3T and the maximum run length is 11T.

Although according to the above quoted embodiment, a method in which an absolute value of a DSV obtained from a code word modulated using a specific coding table is compared with an absolute value of a DSV obtained from a code word modulated using another specific coding table and then a smaller one is adopted has been indicated as a method for the DSV control, the present invention is also valid for other DSV control methods.

For example, the modulation method of the present invention is valid in case where the DSV control is carried out by inserting a DSV control bit every predetermined cycle without replacement of the code words in the coding table even if the coding table of this embodiment is employed. Further, the present invention is also valid in a method for carrying out the DSV control using a different parameter, for example, using a maximum amplitude of the DSV in a specific interval, without using the absolute value of the DSV.

Figure 14:
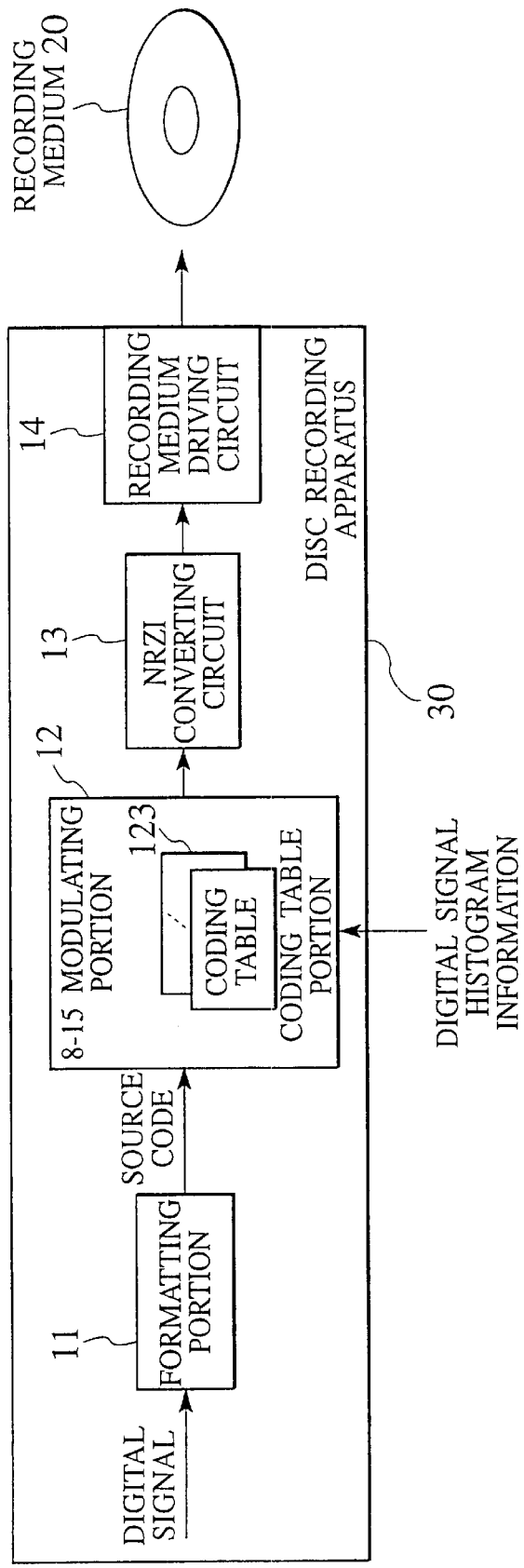
FIG. 14 is a block diagram of a disk recording apparatus including the modulation method and modulator of a second embodiment of the present invention.

Next, a second embodiment of the present invention will be described with reference to the accompanying drawings. FIG. 14 is a block diagram of a disk recording apparatus employing a modulation method and modulator of the second embodiment of the present invention. In the same Figure, like reference numerals are attached to the same components as FIG. 2 and a description thereof is omitted. Referring to FIG. 14, a disk recording apparatus 30 comprises a formatting portion 11, a 8–15 modulating portion 12, a NRZI converting circuit 13 and a recording medium driving circuit 14, and records digital signals relating to information about image and voice in the recording medium 20.

According to the embodiment, digital signal histogram information which indicates appearance frequency of each input data word (hereinafter referred to as input word depending on case) such as image, voice and control signal is obtained preliminarily. If considering the appearance frequency of the input data word including information such as management information about copy protection in case of the DVD, "0" as the input data word has the highest appearance frequency.

By replacing code words so that a code word having a small running digital sum (RDS) and a high inverting frequency of bit/land is allocated so as to suppress the low-pass components as a code word corresponding to the input data word having the highest appearance frequency according to the digital information and histogram information, a new coding table of the coding table portion 123 is produced.

According to this embodiment, the code words are replaced in the coding table portion 123 based on the appearance frequency of the input words so as to create a new coding table and then, coding (modulation) is executed according to the above described method. This method will be described in detail. Here, an example of achieving this embodiment with the six coding tables shown in FIGS. 4 to 10 will be described.

First, the appearance frequency of the input word is obtained. In the example of the DVD, the appearance frequency of the input word "0" is the highest due to setting of the control code. According to the embodiment, the appearance frequency of the input word "0" is assumed to be the highest and operation for code replacement to the input word "0" will be described.

FIG. 15 shows a first mode of the code replacement according to the modulation method of the present invention. Referring to FIG. 15A, in the coding table of status "3", a code word "001001000000000" and the status "4" indicating a state to be transferred next are allocated for the input word "0" as indicated by I. Here, it is replaced with a code word "001001001000100" allocated for the input word "10" as indicated by II as a code word whose RDS is smaller than the originally allocated code word and expressed by repetition of shorter pit/land, because the appearance frequency of the input word "0" is high.

This replacement is possible because the code words allocated for the aforementioned input words "0" and "10" are inherent of the status "3" and do not exist in other status table. Further, by keeping the status information for attaining such transition as "4" which is the same status information as before the replacement, the replacement can be carried out without affecting other tables.

The aforementioned RDS indicates a difference between the number of "1" and that of "0" in a single word and is different from the DSV indicating a difference between the number of "1" and that of "0" in plural words. The DSV indicates that the smaller its absolute value, the fewer the DC component and low-pass component are as well known and the RDS also indicates that the smaller its absolute value, the fewer the DC component and low-pass component of a single code word are.

Referring to FIG. 15B, in the coding table of status "3", a code word "001001000000000" and the indicating a state to be transferred next are allocated for the input word "0" as indicated by I, like FIG. 15A. Here, the code word which is allocated for the input word "0" and includes even number (2) of "1" is with a code word "001001001000000" allocated for an input word "14" as a code word containing odd number(3) of "1" as indicated by X because the appearance frequency of the input word "0" is high.

This replacement is possible because the code words allocated for the input words "0" and "14" are inherent of the table of status "3" and do not exist in any table of other statuses, like FIG. 15A. Further, by keeping the status information for attaining a next transition as "4" like the status information before such replacement, the replacement can be carried out without affecting other tables.

Here, FIG. 15B indicates an example in which if the code word to be replaced includes an even number of "1", it is replaced with a code word including an odd number of "1". In case of a code word including an even number of "1", considering the DSV by paying attention to a head bit and a final bit of the code word, the direction of the DSV as to the head bit is the same as the direction thereof as to the final bit, namely, this is a direction in which the DSV diverges.

On the contrary, in case of a code word including an odd number of "1", the directions of the DSVs as to the head bit and the final bit are opposite to each other, so that the DSV converges. Therefore, by replacing the code word including the even number of "1" with the code word including the odd number of "1", the performance of the DSV control is improved.

Next, the second mode of code word replacement according to the modulation method of the present invention will be described. FIG. 16 shows the second example of the code word replacement according to the modulation method of the present invention. In the coding table of status "3", a code word "001001000000000" and the status "4" to be transferred next are allocated for the input word "0" as indicated by I. Here, it is replaced with a code word "001001001000100" allocated for an input word "8" as indicated by III as a code word whose RDS is smaller than the originally allocated code word and expressed by repetition of shorter pit/land because the appearance frequency of the input word "0" is high.

Here, the code words allocated for the aforementioned input words "0" and "8" are inherent of the table of status "3" and do not exist in any table of other statuses. However, the status allocated for the input word "0" in the table of status "3" is "4" while the status allocated for the input word "8" is "1", so that both are different.

On the other hand, even if each output code word corresponding to input word "0" to "38" in the coding table of status "3" is replaced with each output code word corresponding to input word "0" to "38" in the coding table of status "0", the coding rule that the rung length after the NRZI conversion is restricted to 3T to 11T can be kept. However, if only both the output code words and status information corresponding to the input words "0" and "8" in the table of status "3" are replaced with each other, the status information differs from the status information corresponding to the input words "0" and "8" in the table of status "0", thereby disabling decoding.

Thus, according to this mode, the code word and status information corresponding to the input word "0" in the coding table of status "0" indicated with IV in FIG. 16 is similarly replaced with the code word and status information corresponding to the input word "8" indicated with V in the coding table of the status "0" at the same time.

Next, the third mode of the code word replacement according to the modulation method of the present invention will be described. FIG. 17 shows the third mode of the code word replacement according to the modulation method of the present invention. In the coding table of the status "2", a code word "000000000100000" and the status "4" indicating a status to be transferred next are allocated for the input word "0" as indicated by VI. Here, it is replaced with a code word "000001000100100" allocated for an input word "37" as a code word whose RDS is smaller than the originally allocated code word and expressed by repetition of shorter pit/land because the appearance frequency of the input word "0" is high.

Although the status informations for attaining a next transition allocated for the input word "37" and the input word "0" are both "4" in this case, the coding table of status "0" has the same code word "0000000000100000" for the input word "0" as the different coding table of status "22" has for the input word "0" according to the example shown in FIG. 17. The same is true of an input word "37". That is, as described before, even if output code words corresponding to input words "0" to "38" in the coding table of status "0" and output code words corresponding to input words "0" to "11" and "26" to "47" in the coding table of status "2" are used for replacement, the coding rule can be kept.

Thus, if a code word and status information for attaining a next transition corresponding to an input word "0" and a code word and status information for attaining a next transition corresponding to an input word "37" in only the coding table of status "2" are replaced, the code words and status informations for attaining next transitions corresponding to the input word "0" in the coding table of status "2" and the coding table of status "0" becomes different from each other, and similarly the code words and status informations for attaining next transitions corresponding to the input word "37" in the coding table of status "2" and the coding table of status "0" becomes different from each other, so that the aforementioned coding rule cannot be kept thereby disabling decoding. In other words, in case where the code word is "000000000100000", even if the status of a next code word is found to be "4", which the input word is "0" or "37" cannot be determined unless it is not found which the status of a code word to be decoded is "0" or "2", thereby disabling decoding.

For this reason, in this case, at the same time as replacement in the coding table of status "2", the code word and status information for a next transition allocated for the input word "0" indicated with VIII in FIG. 17 in the coding table of status "0" are replaced with the code word and status information for a next transition allocated for the input word "37" indicated with IX.

In each example shown in FIGS. 15–17, considering the appearance frequency of the input word, a code word having a smaller RDS and expressed with repetition of shorter pits/lands is allocated for the input word "0" having a higher appearance frequency, thereby enabling modulation with further suppressing low-pass components in a recorded signal.

Figure 18:
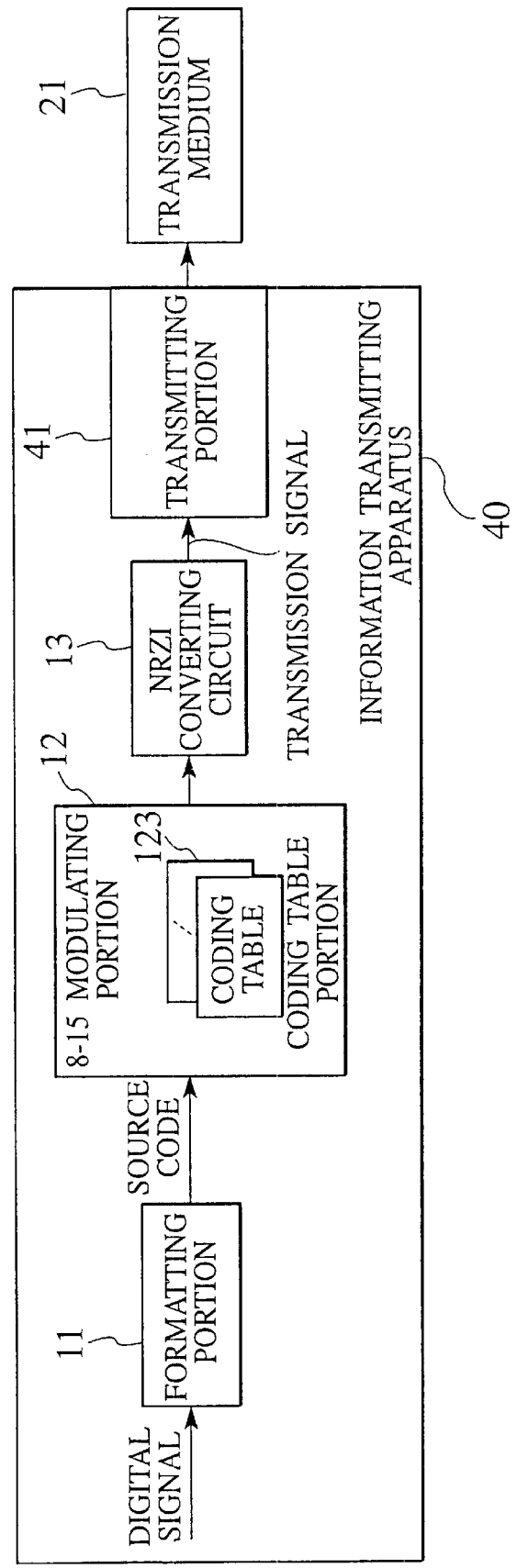
FIG. 18 is a block diagram of an information transmission apparatus employing the modulation method and modulator of the third embodiment of the present invention.

FIG. 18 shows a block diagram of an information transmitting apparatus employing a modulation method and modulator according to a third embodiment of the present invention. In the same Figure, like reference numerals are attached to the same components as in FIG. 2 and a description thereof is omitted. Referring to FIG. 18, an information transmitting apparatus 40 comprises a formatting portion 11, a 8–15 modulating portion 12, a NRZI converting circuit 13 and a transmitting portion 41, and transmits digital signals relating to information about image, voice and the like to a transmission medium 21. Basically, a code word string subjected to 8–15 modulation is generated by the same operation as the disk recording apparatus 10 shown in FIG. 2. However, according to this embodiment, a code word string is not recorded in the recording medium 20 but converted to a predetermined transmission signal through the transmitting portion 41 and then transmitted to the transmission medium 21 such as aerial medium and cable. Consequently, the code word can be transmitted without error by a small data amount.

Figure 19:
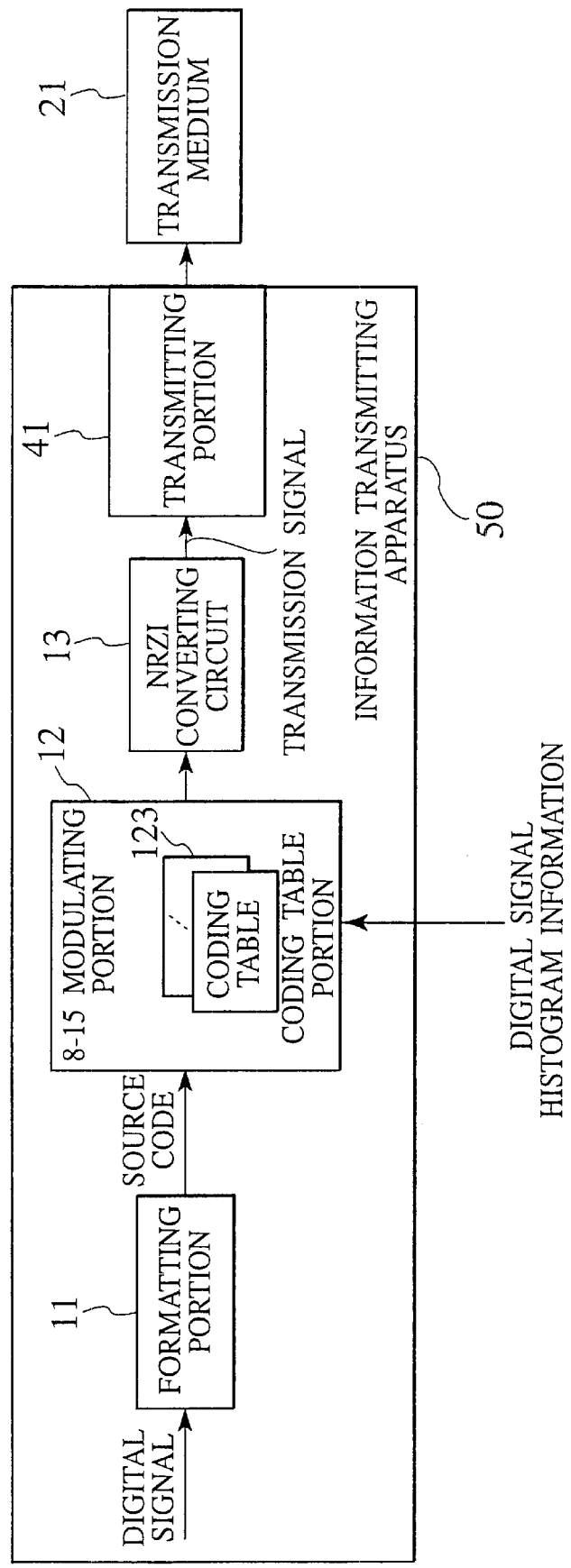
FIG. 19 is a block diagram of an information transmission apparatus employing the modulation method and modulator of a fourth embodiment of the present invention.

FIG. 19 shows a block diagram of an information transmitting apparatus employing a modulation method and modulator according to a fourth embodiment of the present invention. In the same Figure, like reference numerals are attached to the same components as in FIG. 2 and a description thereof is omitted. Referring to FIG. 19, an information transmitting apparatus 50 comprises a formatting portion 11, a 8–15 modulating portion 12, a NRZI converting circuit 13 and a transmitting portion 41, and transmits digital signals relating to information about image, voice and the like to a transmission medium 21. Different from FIG. 18, according to the embodiment, digital signal histogram information indicating appearance frequency of each input data such as image, voice, control signal and the like is preliminary obtained therein and coding tables in a new coding table portion 123 are created by replacement of the code words based on the method described in FIGS. 15 to 17 in order to allocate a code word having a small running digital sum (RDS) and a high frequency of inversions of pit/land to suppress lass-pass components, as a code word corresponding to an input data word having the highest appearance frequency, according to the digital signal and histogram information. Then, the coding (modulation) is carried out according to the method described with reference to FIG. 3 and the like using this coding tables. The obtained code word string is transmitted to the transmission medium 21 through the transmitting portion 41.

The present invention is not restricted to the above-described embodiments. For example, although according to each of the above described embodiments, the code word and status information allocated corresponding to input data having the highest appearance frequency preliminarily obtained for each input data are replaced with other code word and status information having a smaller RDS than the former code word allocated corresponding to another input data in the same coding table, it is permissible to replace by a number (which may be plural) set up preliminarily in succession from the highest appearance frequency to a lower appearance frequency and thus it is not restricted to the one having the highest appearance frequency.

As described above, according to the modulation method, modulator and transmitting apparatus of the present invention, the coding tables can be composed of six coding tables, which is of smaller number, so that with a smaller circuit scale than the conventional one, such a modulation for obtaining a q-bit code word from a p-bit input word which satisfies a predetermined run length restriction rule (q>p) can be carried out and then the modulated code word can be transmitted.

Further, according to the modulation method, modulator and transmitting apparatus of the present invention, because an input word having the highest appearance frequency is modulated to a code word expressed by repetition of a shorter pit/land than conventionally and transmitted, a modulation at a higher coding rate suitable for a higher density with further suppressing low-pass components as a whole can be achieved and also a transmission of code words modulated in this way can be achieved.

Further, according to the recording medium of the present invention, input data words of a number set up preliminarily in succession from the highest appearance frequency to a lower one are recorded as a code word expressed by a repetition of a shorter pit/land than conventionally. Consequently, code words modulated at a high coding rate with further suppressing low-pass components as a whole can be reproduced.

It should be understood that many modifications and adaptations of the invention will become apparent to those skilled in the art and it is intended to encompass such obvious modifications and changes in the scope of the claims appended hereto.

What is claimed is:

1. A modulation method for performing a modulation to obtain a q-bit code word from a p-bit input data word (q>p) using plural coding tables, wherein the plural coding tables comprise six coding tables each storing a code word and status information indicating a coding table for use in modulating a next input data word in order to obtain a next code word which satisfies a predetermined run length restriction rule even if the next code word is coupled directly with the code word, corresponding to each input data word; and in a specific coding table and another specific coding table of the six coding tables, code words stored corresponding to each predetermined input data word are determined to have an even/odd relation such that the number of "1" in a code word in the specific coding table is even while the number of "1" in a code word in the other specific coding table is odd so as to enable DSV control; and upon modulating the predetermined input data word, a code word which satisfies the predetermined run length restriction rule is outputted while the DSV control is carried out by referring to the six coding tables.

2. A modulation method according to claim 1 wherein the p-bit is 8 bits while the q-bit is 15 bits and the run length restriction rule specifies that its minimum run length of a signal obtained by NRZI-converting the code word is 3T (T is a channel bit period of the code word) and its maximum run length thereof is 11T to 14T.

3. A modulation method wherein upon performing a modulation to obtain a q-bit code word from a p-bit input data word (q>p) using plural coding tables, each coding table stores a code word and status information indicating a coding table for use in modulating a next input data word in order to obtain a next code word which satisfies a predetermined run length restriction rule even if the next code word is coupled directly with the code word, corresponding to each input data word; and in a specific coding table and another specific coding table of the plural coding tables, code words stored corresponding to each predetermined input data word are determined to have an even/odd relation such that the number of "1" in a code word in the specific coding table is even while the number of "1" in a code word in the other specific coding table is odd so as to enable DSV control; and upon modulating the predetermined input data word, a code word which satisfies the predetermined run length restriction rule is outputted while the DSV control is carried out by referring to the plural coding tables, the modulation method comprising:
  obtaining the appearance frequency of each input data preliminarily;
  replacing code words and status informations allocated corresponding to input data words of a number set up preliminarily in succession from the highest appearance frequency to a lower one in one or more coding tables of the plural coding tables, with code words and status informations allocated corresponding to other input data words in the same coding table so as to reduce a DSV value of a code word series; and
  modulating the input data word using the plural coding tables including the one or more coding tables each whose code word and status table are replaced.

4. A modulation method according to claim 3 wherein when the one or more coding tables each whose code words and status informations are replaced are one of the specific coding table and the other specific coding table, the replacement of the code words and status informations corresponding to the same input data words in the other of the two specific coding tables is also carried out.

5. A modulation method according to claim 3 wherein the p-bit is 8 bits while the q-bit is 15 bits and the run length restriction rule specifies that its minimum run length of a signal obtained by NRZI-converting the code word is 3T (T is a channel bit period of the code word) and its maximum run length thereof is 11T to 14T.

6. A modulator wherein upon performing a modulation to obtain a q-bit code word from a p-bit input data word (q>p) using plural coding tables, the plural coding tables comprise six coding tables each storing a code word and status information indicating a coding table for use in modulating a next input data word in order to obtain a next code word which satisfies a predetermined run length restriction rule even if the next code word is coupled directly with the code word, corresponding to each input data word; and in a specific coding table and another specific coding table of the six coding tables, code words stored corresponding to each predetermined input data word are determined to have an even/odd relation such that the number of "1" in a code word in the specific coding table is even while the number of "1" in a code word in the other specific coding table is odd so as to enable DSV control; and a modulated code word which satisfies the predetermined run length restriction rule is outputted while the DSV control is carried out by referring to the six coding tables, the modulator comprising:
- a detecting portion for detecting whether a current output code word is uniquely determined or there is any option based on the input data word and the status information determined by a preceding output code word;
- an address computing portion which has the six coding tables, and if a detection result from the detecting portion is presence of an option, computes plural kinds of addresses of the six coding tables and outputs plural code words corresponding to the input data word from coding tables having the respective computed addresses, while if the detection result from the detecting portion is absence of any option, computes an address of one of the six coding tables including the one or more coding tables each whose code word and status information are replaced and outputs a code word corresponding to the input data word from a coding table having the computed address; and
- a control/output means for selecting a path having a smallest DSV value between plural paths which accumulates respective code words outputted from the address computing portion.

7. A modulator according to claim 6 wherein the control/output means includes:
- a storage means for accumulating code words after the modulated code word is outputted for each of plural code words outputted from the address computing portion through plural paths and storing plural DSV values obtained from all previously selected code words and the accumulated code words;
- a comparing portion for comparing absolute values of the plural DSV values outputted from the storage means;
- a code output means for selecting and outputting the accumulated code words through a path corresponding to a DSV value having the smallest absolute value as the modulated code word from the storage means according to a comparison result of the comparing portion, and replacing respective accumulated code words and respective DSV values through paths other than the path corresponding to the DSV value having the smallest absolute value in the storage means with the accumulated code words and the DSV value through the path corresponding to the DSV value having the smallest absolute value.

8. A modulator according to claim 6 further comprising a converting circuit for NRZI-converting the modulated code word outputted from the control/output means and a recording means for recording a code word outputted from the converting circuit.

9. A modulator according to claim 6 wherein the p-bit is 8 bits while the q-bit is 15 bits and the run length restriction rule specifies that its minimum run length of a signal obtained by NRZI-converting the code word is 3T (T is a channel bit period of the code word) and its maximum run length thereof is 11T to 14T.

10. A modulator wherein upon performing a modulation to obtain a q-bit code word from a p-bit input data word (q>p) using plural coding tables, each coding table stores a code word and status information indicating a coding table for use in modulating a next input data word in order to obtain a next code word which satisfies a predetermined run length restriction rule even if the next code word is coupled directly with the code word, corresponding to each input data word; and in a specific coding table and another specific coding table of the six coding tables, code words stored corresponding to each predetermined input data word are determined to have an even/odd relation such that the.number of "1" in a code word in the specific coding table is even while the number of "1" in a code word in the other specific coding table is odd so as to enable DSV control; and a modulated code word which satisfies the predetermined run length restriction rule is outputted while the DSV control is carried out by referring to the plural coding tables, the modulator comprising:
- a detecting portion for detecting whether a current output code word is uniquely determined or there is any option based on the input data word and the status information determined by a preceding output code word;
- an address computing portion which has the plural coding tables, wherein code words and status informations allocated corresponding to input data words of a number set up preliminarily in succession from the highest appearance frequency to a lower one in one or more coding tables of the plural coding tables are replaced with code words and status informations allocated corresponding to other input data words in the same coding table so as to reduce a DSV value of a code word series, the address computing portion, if a detection result from the detecting portion is presence of an option, computing plural kinds of addresses of the plural coding tables including the one or more coding tables each whose code word and status information are replaced and outputting plural code words corresponding to the input data word from coding tables having the respective computed addresses, while if the detection result from the detecting portion is absence of any option, computing an address of one of the plural coding tables including the one or more coding tables each whose code word and status information are replaced and outputting a code word corresponding to the input data word from a coding table having the computed address; and
- a control/output means for selecting a path having a smallest DSV value between plural paths which accumulates respective code words outputted from the address computing portion.

11. A modulator according to claim 10 wherein when the one or more coding tables each whose code words and status informations are replaced are one of the specific coding table and the other specific coding table, the replacement of the code words and status informations corresponding to the same input data words in the other of the two specific coding tables is also carried out.

12. A modulator according to claim 10 wherein the control/output means includes:
   a storage means for accumulating code words after the modulated code word is outputted for each of plural code words outputted from the address computing portion through plural paths and storing plural DSV values obtained from all previously selected code words and the accumulated code words;
   a comparing portion for comparing absolute values of the plural DSV values outputted from the storage means;
   a code output means for selecting and outputting the accumulated code words through a path corresponding to a DSV value having the smallest absolute value as the modulated code word from the storage means according to a comparison result of the comparing portion, and replacing respective accumulated code words and respective DSV values through paths other than the path corresponding to the DSV value having the smallest absolute value in the storage means with the accumulated code words and the DSV value through the path corresponding to the DSV value having the smallest absolute value.

13. A modulator according to claim 10 further comprising a converting circuit for NRZI-converting the modulated code word outputted from the control/output means and a recording means for recording a code word outputted from the converting circuit.

14. A modulator according to claim 10 wherein the p-bit is 8 bits while the q-bit is 15 bits and the run length restriction rule specifies that its minimum run length of a signal obtained by NRZI-converting the code word is 3T (T is a channel bit period of the code word) and its maximum run length thereof is 11T to 14T.

15. A transmission apparatus wherein upon performing a modulation to obtain a q-bit code word from a p-bit input data word (q>p) using plural coding tables, the plural coding tables comprise six coding tables each storing a code word and status information indicating a coding table for use in modulating a next input data word in order to obtain a next code word which satisfies a predetermined run length restriction rule even if the next code word is coupled directly with the code word, corresponding to each input data word; and in a specific coding table and another specific coding table of the six coding tables, code words stored corresponding to each predetermined input data word are determined to have an even/odd relation such that the number of "1" in a code word in the specific coding table is even while the number of "1" in a code word in the other specific coding table is odd so as to enable DSV control; and a modulated code word which satisfies the predetermined run length restriction rule is generated while the DSV control is carried out by referring to the six coding tables; and the generated code word is transmitted successively by radio or wire,
   the transmission apparatus comprising:
      a detecting portion for detecting whether a current output code word is uniquely determined or there is any option based on the input data word and the status information determined by a preceding output code word;
      an address computing portion which has the six coding tables, and if a detection result from the detecting portion is presence of an option, computes plural kinds of addresses of the six coding tables and outputs plural code words corresponding to the input data word from coding tables having the respective computed addresses, while if the detection result from the detecting portion is absence of any option, computes an address of one of the six coding tables including the one or more coding tables each whose code word and status information are replaced and outputs a code word corresponding to the input data word from a coding table having the computed address; and
      a control/output means for selecting a path having a smallest DSV value between plural paths which accumulates respective code words outputted from the address computing portion.

16. A transmission apparatus according to claim 15 wherein the control/output means includes:
   a storage means for accumulating code words after the modulated code word is outputted for each of plural code words outputted from the address computing portion through plural paths and storing plural DSV values obtained from all previously selected code words and the accumulated code words;
   a comparing portion for comparing absolute values of the plural DSV values outputted from the storage means;
   a code output means for selecting and outputting the accumulated code words through a path corresponding to a DSV value having the smallest absolute value as the modulated code word from the storage means according to a comparison result of the comparing portion, and replacing respective accumulated code words and respective DSV values through paths other than the path corresponding to the DSV value having the smallest absolute value in the storage means with the accumulated code words and the DSV value through the path corresponding to the DSV value having the smallest absolute value.

17. A transmission apparatus according to claim 15 further comprising a converting circuit for NRZI-converting the modulated code word output ted from the control/output means and a transmitting portion for transmitting a code word outputted from the converting circuit.

18. A transmission apparatus according to claim 15 wherein the p-bit is 8 bits while the q-bit is 15 bits and the run length restriction rule specifies that its minimum run length of a signal obtained by NRZI-converting the code word is 3T (T is a channel bit period of the code word) and its maximum run length is 11T to 14T.

19. A transmission apparatus wherein upon performing a modulation to obtain a q-bit code word from a p-bit input data word (q>p) using plural coding tables, each coding table stores a code word and status information indicating a coding table for use in modulating a next input data word in order to obtain a next code word which satisfies a predetermined run length restriction rule even if the next code word is coupled directly with the code word, corresponding to each input data word; and in a specific coding table and another specific coding table of the six coding tables, code words stored corresponding to each predetermined input data word are determined to have an even/odd relation such that the number of "1" in a code word in the specific coding table is even while the number of "1" in a code word in the other specific coding table is odd so as to enable DSV control; and a modulated code word which satisfies the predetermined run length restriction rule is generated while the DSV control is carried out by referring to the plural coding tables; and the generated code word is transmitted successively by radio or wire,
   the transmission apparatus comprising:
      a detecting portion for detecting whether a current output code word is uniquely determined or there is any option based on the input data word and the status information determined by a preceding output code word;

an address computing portion which has the plural coding tables, wherein code words and status informations allocated corresponding to input data words of a number set up preliminarily in succession from the highest appearance frequency to a lower one in one or more coding tables of the plural coding tables are replaced with code words and status informations allocated corresponding to other input data words in the same coding table so as to reduce a DSV value of a code word series, the address computing portion, if a detection result from the detecting portion is presence of an option, computing plural kinds of addresses of the plural coding tables including the one or more coding tables each whose code word and status information are replaced and outputting plural code words corresponding to the input data word from coding tables having the respective computed addresses, while if the detection result from the detecting portion is absence of any option, computing an address of one of the plural coding tables including the one or more coding tables each whose code word and status information are replaced and outputting a code word corresponding to the input data word from a coding table having the computed address; and a control/output means for selecting a path having a smallest DSV value between plural paths which accumulates respective code words outputted from the address computing portion.

20. A transmission apparatus according to claim 19 wherein when the one or more coding tables each whose code words and status informations are replaced are one of the specific coding table and the other specific coding table, the replacement of the code words and status informations corresponding to the same input data words in the other of the two specific coding tables is also carried out.

21. A transmission apparatus according to claim 19 wherein the control/output means includes:

a storage means for accumulating code words after the modulated code word is outputted for each of plural code words outputted from the address computing portion through plural paths and storing plural DSV values obtained from all previously selected code words and the accumulated cede words;

a comparing portion for comparing absolute values of the plural DSV values outputted from the storage means;

a code output means for selecting and outputting the accumulated code words through a path corresponding to a DSV value having the smallest absolute value as the modulated code word from the storage means according to a comparison result of the comparing portion, and replacing respective accumulated code words and respective DSV values through paths other than the path corresponding to the DSV value having the smallest absolute value in the storage means with the accumulated code words and the DSV value through the path corresponding to the DSV value having the smallest absolute value.

22. A transmission apparatus according to claim 19 further comprising a converting circuit for NRZI-converting the modulated code word output ted from the control/output means and a transmitting portion for transmitting a code word outputted from the converting circuit.

23. A transmission apparatus according to claim 19 wherein the p-bit is 8 bits while the q-bit is 15 bits and the run length restriction rule specifies that its minimum run length of a signal obtained by NRZI-converting the code word is 3T (T is a channel bit period of the code word) and its maximum run length is 11T to 14T.

24. A recording medium for recording an NRZI-converted code word obtained by NRZI-converting a code word of q bits obtained by modulating p-bit input data word (q>p) according to six coding tables while carrying out a DSV control; each coding table storing a code word and status information indicating a coding table for use in modulating a next input data word in order to obtain a next code word which satisfies a predetermined run length restriction rule even if the next code word is coupled directly with the code word, corresponding to each input data word; in a specific coding table and another specific coding table of the six coding tables, code words stored corresponding to each predetermined input data word being determined to have an even/odd relation such that the number of "1" in a code word in the specific coding table is even while the number of "1" in a code word in the other specific coding table is odd so as to enable DSV control.

25. A recording medium according to claim 24 wherein the p-bit is 8 bits while the q-bit is 15 bits and the run length restriction rule specifies that its minimum run length of a signal obtained by NRZI-converting the code word is 3T (T is a channel bit period of the code word) and its maximum run length is 11T to 14T.

26. A recording medium for recording an NRZI-converted code word obtained by NRZI-converting a code word of q bits obtained by modulating p-bit input data word (q>p) according to six coding tables while carrying out a DSV control; each coding table storing a code word and status information indicating a coding table for use in modulating a next input data word in order to obtain a next code word which satisfies a predetermined run length restriction rule even if the next code word is coupled directly with the code word, corresponding to each input data word; in a specific coding table and another specific coding table of the six coding tables, code words stored corresponding to each predetermined input data word being determined to have an even/odd relation such that the number of "1" in a code word in the specific coding table is even while the number of "1" in a code word in the other specific coding table is odd so as to enable DSV control, wherein code words and status informations allocated corresponding to input data words of a number set up preliminarily in succession from the highest appearance frequency to a lower one in one or more coding tables of the plural coding tables are replaced with code words and status informations allocated corresponding to other input data words in the same coding table so as to reduce a DSV value of a code word series, and a code word of q bits obtained by modulating p-bit input data word (q>p) using the plural coding tables including the one or more coding tables each whose code word and status table are replaced is NRZI-converted and recorded.

27. A recording medium according to claim 26 wherein the p-bit is 8 bits while the q-bit is 15 bits and the run length restriction rule specifies that its minimum run length of a signal obtained by NRZI-converting the code word is 3T (T is a channel bit period of the code word) and its maximum run length is 11T to 14T.

* * * * *